US007375143B2

(12) United States Patent
Kopponen et al.

(10) Patent No.: US 7,375,143 B2
(45) Date of Patent: May 20, 2008

(54) CATALYST RECOVER FROM A SLURRY

(75) Inventors: Sara I. Kopponen, Anchorage, AK (US); Ralph T. Goodwin, Ponca City, OK (US); Kristi A. Fjare, Ponca City, OK (US); Barbara A. Belt, Seabrook, TX (US); Brian J. Levitt, Aurora, CO (US); Kindra Snow-McGregor, Parker, CO (US); Richard J. Wissbaum, Littleton, CO (US); Mariella L. Raven, Houston, TX (US); Frank B. Walter, Englewood, CO (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 11/284,561

(22) Filed: Nov. 22, 2005

(65) Prior Publication Data

US 2006/0135631 A1    Jun. 22, 2006

Related U.S. Application Data

(60) Provisional application No. 60/630,015, filed on Nov. 22, 2004.

(51) Int. Cl.
*C07C 27/00* (2006.01)
*B01J 20/34* (2006.01)

(52) U.S. Cl. ............... 518/710; 518/709; 518/715; 502/22; 502/38; 502/44

(58) Field of Classification Search ........... 518/700, 518/709, 715, 710; 502/22, 38, 44
See application file for complete search history.

(56) References Cited

U.S. PATENT DOCUMENTS

| | | | |
|---|---|---|---|
| 2,225,487 A | 12/1940 | Roelen | |
| 2,238,726 A | 4/1941 | Feisst | |
| 2,247,087 A | 6/1941 | Herbert | |
| 2,259,961 A | 10/1941 | Whalley | |
| 2,289,731 A | 7/1942 | Roelen et al. | |
| 2,436,568 A | 2/1948 | Griffin et al. | |
| 2,440,109 A | 4/1948 | Moore | |
| 2,458,870 A | 1/1949 | Ogorzaly | |
| 2,468,494 A | 4/1949 | Griffin, Jr. | |
| 2,479,420 A | 8/1949 | Segura | |
| 2,487,159 A | 11/1949 | McAdams et al. | |
| 2,487,867 A | 11/1949 | Griffin, Jr. | |
| 2,493,917 A | 1/1950 | Hengstebeck | |
| 2,500,056 A | 3/1950 | Barr | |
| 2,518,337 A | 8/1950 | Krebs | |
| 2,615,911 A | 10/1952 | Williams | |
| 2,626,246 A | 1/1953 | Naragon et al. | |
| 2,775,607 A | 12/1956 | Kölbel | |
| 3,773,890 A | 11/1973 | Fox et al. | |
| 4,145,397 A | 3/1979 | Toida et al. | |
| 4,514,368 A | 4/1985 | Hubred | |
| 4,670,229 A | 6/1987 | Wiewiorowski et al. | |
| 4,795,726 A | 1/1989 | Schaper et al. | |
| 5,066,469 A | 11/1991 | Marcantonio | |
| 6,068,760 A | 5/2000 | Benham et al. | |
| 6,462,098 B1 | 10/2002 | Vogel et al. | |
| 6,812,179 B2 | 11/2004 | Huang et al. | |
| 6,887,390 B2 | 5/2005 | Mohedas et al. | |
| 6,929,754 B2 | 8/2005 | Espinoza et al. | |
| 2002/0183403 A1 | 12/2002 | Huang et al. | |
| 2004/0219082 A1 | 11/2004 | Matjie et al. | |
| 2004/0259963 A1 | 12/2004 | Huang et al. | |

FOREIGN PATENT DOCUMENTS

GB          504700          4/1939

OTHER PUBLICATIONS

Sie & Krishna, "Fundamentals and selection of advanced Fischer-Tropsch reactors", Applied Catalysis A: General, vol. 186, pp. 55-70 (1999).

*Primary Examiner*—J. Parsa
(74) *Attorney, Agent, or Firm*—Conley Rose P.C.

(57) ABSTRACT

Embodiments of the invention relate to processes and apparatus for the washing and recovery of metal-containing catalyst solids in a form suitable for reclamation. More specifically, a catalyst recovery process comprises removing an organic residue with a washing medium from a metal-containing catalyst solids, recovering washed solids, and treating the washed solids under oxidative conditions to form non-reactive solids. The treatment oxidative conditions may be effective to convert the metal(s) into an oxide form and/or may facilitate the removal of remaining organic residue from the washed solids. The treatment of the washed solids may comprise calcination. In some embodiments, the metal-containing catalyst solids may be recovered from a slurry stream, and the process further comprises passing the slurry stream though a separation unit to obtain a catalyst-enriched retentate slurry. In some embodiments, the organic residue comprises a hydrocarbon wax, and the solid catalyst is a hydrocarbon synthesis particulate catalyst.

25 Claims, 4 Drawing Sheets

CATALYST RECOVER FROM A SLURRY

CROSS-REFERENCE TO RELATED APPLICATIONS

This non-provisional application claims priority to and the benefit of U.S. Provisional Application Ser. No. 60/630,015, entitled "Processes for Catalyst Recovery from a Slurry Employing Wax Displacement and Oxidation", filed on Nov. 22, 2004, of which the entire disclosure (including any and all figures) is incorporated herein by reference for all purposes. This application is further related to U.S. patent application Ser. No. 10/994,428, entitled "A Multi-Staged Wax Displacement Process for Catalyst Recovery from a Slurry," and to U.S. patent application Ser. No. 10/994,506, now U.S. Pat. No. 6,974,842, entitled "A Process for Catalyst Recovery from a Slurry Containing Residual Hydrocarbons," each filed on Nov. 22, 2004 concurrently with U.S. Provisional Application Ser. No. 60/630,015, and each of which is incorporated herein by reference in its entirety for all purposes.

STATEMENT REGARDING FEDERALLY SPONSORED RESEARCH OR DEVELOPMENT

Not applicable.

FIELD OF THE INVENTION

This invention generally relates to the cleaning and recovery of metal-containing catalyst solids for reclamation. More specifically, the invention relates to a catalyst recovery process that removes wax hydrocarbons from a spent particulate Fischer-Tropsch catalyst comprising at least one metallic component using a solvent, recovers the spent particulate catalyst and treats the spent recovered catalyst under oxidative conditions to form a non-reactive spent catalyst that can be safely transported or shipped to a reclamation facility.

BACKGROUND OF THE INVENTION

Natural gas, found in deposits in the earth, is an abundant energy resource. For example, natural gas commonly serves as a fuel for heating, cooking, and power generation, among other things. The process of obtaining natural gas from an earth formation typically includes drilling a well into the formation. Wells that provide natural gas are often remote from locations with a demand for the consumption of the natural gas.

Thus, natural gas is conventionally transported large distances from the wellhead to commercial destinations in pipelines. This transportation presents technological challenges due in part to the large volume occupied by a gas. Because the volume of a gas is so much greater than the volume of a liquid containing the same number of gas molecules, the process of transporting natural gas typically includes chilling and/or pressurizing the natural gas in order to liquefy it. However, this contributes to the final cost of the natural gas.

Further, naturally occurring sources of crude oil used for liquid fuels such as gasoline and middle distillates have been decreasing and supplies are not expected to meet demand in the coming years. Middle distillates typically include heating oil, jet fuel, diesel fuel, and kerosene. Fuels that are liquid under standard atmospheric conditions have the advantage that in addition to their value, they can be transported more easily in a pipeline than natural gas, since they do not require energy, equipment, and expense required for liquefaction.

Thus, for all of the above-described reasons, there has been interest in developing technologies for converting natural gas to more readily transportable liquid fuels, i.e. to fuels that are liquid at standard temperatures and pressures. One method for converting natural gas to liquid fuels involves two sequential chemical transformations. In the first transformation, natural gas or methane, the major chemical component of natural gas, is reacted with oxygen and/or steam to form synthesis gas or syngas, which is a combination of carbon monoxide gas and hydrogen gas. The second transformation is commonly known as the Fischer-Tropsch synthesis, in which carbon monoxide is reacted with hydrogen to form organic molecules containing carbon and hydrogen, such as hydrocarbons and oxygenates (containing oxygen in addition to carbon and hydrogen). Synthesized hydrocarbons generally include paraffins and/or olefins. Paraffins are particularly desirable as the basis of synthetic diesel fuel.

Typically the Fischer-Tropsch product stream contains hydrocarbons having a range of numbers of carbon atoms, and thus having a range of molecular weights. Thus, the Fischer-Tropsch products produced by conversion of natural gas commonly contain a range of hydrocarbons including gases, liquids and waxes. Depending on the molecular weight product distribution, different Fischer-Tropsch product mixtures are ideally suited to different uses. For example, Fischer-Tropsch product mixtures containing liquids may be processed to yield gasoline, as well as heavier middle distillates. Hydrocarbon waxes may be subjected to an additional processing step for conversion to liquid and/or gaseous hydrocarbons. Thus, in the production of a Fischer-Tropsch product stream for processing to a fuel it is desirable to maximize the production of high value liquid hydrocarbons, such as hydrocarbons with at least 5 carbon atoms per hydrocarbon molecule ($C_{5+}$ hydrocarbons).

The Fischer-Tropsch process is commonly facilitated by a catalyst. Catalysts desirably have the function of increasing the rate of a reaction without being consumed by the reaction. A feed containing carbon monoxide and hydrogen is typically contacted with a catalyst in a reaction zone that may include one or more reactors.

Common reactors include packed bed (also termed fixed bed) reactors, fluidized bed reactors and slurry bed reactors. Originally, the Fischer-Tropsch synthesis was carried out in packed bed reactors. These reactors have several drawbacks, such as temperature control, that can be overcome by gas-agitated slurry reactors or slurry bubble column reactors. Gas-agitated multiphase reactors sometimes called "slurry reactors" or "slurry bubble columns," operate by suspending catalytic particles in liquid and feeding gas reactants into the bottom of the reactor through a gas distributor, which produces gas bubbles. As the gas bubbles rise through the reactor, the reactants are absorbed into the liquid and diffuse to the catalyst where, depending on the catalyst system, they are typically converted to gaseous and liquid products. The gaseous products formed enter the gas bubbles and are collected at the top of the reactor. Liquid products are recovered from the suspending liquid by using different techniques like filtration, settling, hydrocyclones, magnetic techniques, etc. Gas-agitated multiphase reactors or slurry bubble column reactors (SBCRs) inherently have very high heat transfer rates, and therefore, reduced reactor cost. This, and the ability to remove and add catalyst online are some of the principal advantages of such reactors as applied to the exothermic Fischer-Tropsch synthesis. Sie and Krishna (Applied Catalysis A: General 1999, 186, p. 55), incorporated herein by reference in its entirety, give a history of the development of various Fischer Tropsch reactors.

Typically, in the Fischer-Tropsch synthesis, the distribution of weights that is observed such as for $C_{5+}$ hydrocarbons, can be described by likening the Fischer-Tropsch reaction to a polymerization reaction with an Anderson-Shultz-Flory chain growth probability ($\alpha$) that is independent of the number of carbon atoms in the lengthening molecule. $\alpha$ is typically interpreted as the ratio of the mole fraction of $C_{n+1}$ product to the mole fraction of $C_n$ product. A value of $\alpha$ of at least 0.72 is preferred for producing high carbon-length hydrocarbons, such as those of diesel fractions.

The composition of a catalyst influences the relative amounts of hydrocarbons obtained from a Fischer-Tropsch catalytic process. Common catalysts for use in the Fischer-Tropsch process contain at least one metal from Groups 8, 9, or 10 of the Periodic Table (in the new IUPAC notation, which is used throughout the present specification).

Cobalt metal is particularly desirable in catalysts used in converting natural gas to heavy hydrocarbons suitable for the production of diesel fuel. Alternatively, iron, nickel, and ruthenium have been used in Fischer-Tropsch catalysts. Nickel catalysts favor termination and are useful for aiding the selective production of methane from syngas. Iron has the advantage of being readily available and relatively inexpensive but the disadvantage of a high water-gas shift activity. Ruthenium has the advantage of high activity but is quite expensive.

Many petroleum and chemical processes use particulate catalysts for the conversion of a feedstock to one or more desired products, such as the Fischer-Tropsch process described herein. In any reaction requiring a particulate catalyst, the particulate catalyst can be expected to have a certain life, for example several months to a few years. Accordingly, as the time on line increases, the particulate catalyst tends to degrade and eventually becomes ineffective. The catalyst can then be considered 'spent' and, a portion of or all of the spent catalyst can be removed from a reactor vessel. In order to maintain catalyst inventory in the reactor, new and/or regenerated catalyst can be loaded therein. The selection of a particulate catalyst composition to be used in a specific reaction system may largely depend on the cost of manufacture of the catalyst and the ability for the catalyst activity to be restored. The spent catalyst removed from the reactor vessel can undergo a regeneration process if the activity of the removed spent catalyst can at least be partially restored. However, in some cases the loss of catalyst activity is irreversible. In this case, it may be possible for the spent catalyst to undergo a reclamation process to recover some of or all of the valuable materials (especially its metallic components).

An important aspect of the economics of a commercial hydrocarbon synthesis process, such as employing the Fischer-Tropsch synthesis, is the efficient utilization of the metals used in the hydrocarbon synthesis particulate catalyst. The initial costs of the metals employed in such particulate catalyst are a large capital expenditure. Accordingly, once the catalyst has, in one way or another, become unacceptable for continued use in the hydrocarbon synthesis process, it is economically wise to take steps to recover the metals from the spent catalyst for reuse, for example to prepare new batches of fresh particulate catalyst. While such reclamation facilities may be located at or in proximity to the hydrocarbon synthesis process site, these facilities are often offsite thus requiring that the spent catalyst be transported or shipped for further processing to extract valuable metallic components. One step in this effort is to prepare the spent catalyst for safe transport to the location where at least some of the metallic components (e.g., metal or metals) will be recovered.

In such cases, it is preferable to remove any residual hydrocarbon products from the spent particulate catalyst prior to processing the spent particulate catalyst through a reclamation process. In this way, one can recover the value of the hydrocarbon products, convert the catalyst from a reactive form to an inert form, avoid the additional transportation costs associated with the weight of the residual hydrocarbon products, and in some instances, minimize the presence of hydrocarbonaceous compounds in any waste materials for environmental conservation reasons.

Therefore, a need exists in the art for efficient methods and systems for the removal of organic materials from solid catalysts, and in particular removal of hydrocarbon products from Fischer-Tropsch spent catalysts, and for the conversion of metallic component(s) of these catalysts into non-reactive form, to lessen safety concerns during transportation to reclamation facilities and/or to facilitate the reclamation of metallic components from such catalysts.

SUMMARY OF THE INVENTION

The present invention relates to various embodiments of a process and of an apparatus for recovering a spent solid catalyst.

The spent solid catalyst fed to the process preferably comprises a metallic component and an organic residue. The recovered solids after such process are in non-reactive form and are very lean or substantially-free in organic residue. The recovered solids are in a suitable form for transport to a reclamation facility and for processing in said facility, wherein some of the metallic component of the recovered solids can be extracted, recovered and reused, for example in forming fresh catalyst batches.

Generally, the process for recovering a spent solid catalyst comprises removing the organic residue from the spent solid catalyst and treating the spent solid catalyst under suitable conversion conditions in order to convert the metallic component into a non-reactive form. A non-reactive form of a metal preferably comprises a non-zero valent form of the metal. Examples of non-reactive form of a metal include a metal sulfide, a metal oxide, or combinations thereof.

In some process embodiments, the spent solid catalyst may be recovered from a slurry stream. The slurry stream may be derived at least in part from a slurry bed reactor which contains a slurry comprising a metal-containing solid catalyst and the organic residue. In the slurry, the metal-containing solid catalyst is dispersed in a dispersing liquid. The dispersing liquid may contain at least a portion of the organic residue in the form of an organic liquid. The catalyst slurry stream may be periodically or continuously removed from a slurry reactor, either partially for catalyst maintenance (e.g., by withdrawing a slurry stream) or completely for equipment maintenance or may be removed at a given time in the case of a reactor operation upset. The catalyst slurry stream may be diluted by the addition of a second feedstream for any of the following reasons or any combination thereof: to improve the slurry flowability (e.g., reducing viscosity); to improve the slurry stream transportability (e.g., pumpability); to adjust the solids content of the slurry stream; to adjust the organic residue content of the slurry stream; to adjust the composition of the organic residue in the slurry stream; to displace heavy organic components of the organic residue with lighter ones; to displace at least some of the organic residue from the solid catalyst structure and dissolve the displaced organic residue; to adjust the slurry temperature to a more desirable range.

In such embodiments when the solid catalyst is recovered from a slurry stream, the process comprises the following steps: separating the slurry stream into a liquid stream and a catalyst-enriched stream which is lean in organic residue; washing the solid catalyst with a washing medium; and treating the solid catalyst under oxidative conditions to convert its metallic component into an oxide form. The liquid stream may be lean in solid catalyst or substantially-free in solid catalyst. In some embodiments, the separation step precedes the oxidative treatment; and at least a portion of the catalyst-enriched stream is sent to the oxidative treatment. The washing step can be carried out after the separation step, or preferably is carried out simultaneously to the separation step. In preferred embodiments, the washing and separation steps are carried out in the same unit. In some embodiments, the washing step is carried out before the oxidative treatment. The process may further include adding heat at any step selected from the separation step, the washing step, or the oxidative treatment step. The process may further include removing, after the washing step, at least a portion of the remaining organic residue from the solid catalyst by stripping with the use of a stripping gas and/or by vaporizing with the addition of heat. The stripping step may be carried out before, during or after the oxidative treatment step, preferably at the same time as oxidative treatment step or in the same unit.

In alternate process embodiments, the solid catalyst is recovered from a catalyst slurry which comprises hydrocarbon wax. In such embodiments, the process may comprise the following steps: a) providing a catalyst slurry feedstream comprising a solid catalyst and wax hydrocarbons, said solid catalyst comprising a metallic component; b) optionally, adding a second feedstream to the catalyst slurry feedstream; c) passing the catalyst slurry feedstream through a solid-liquid separation unit to separate said slurry feedstream into a liquid stream and a retentate stream, both of which exit the solid-liquid separation unit, wherein the retentate stream is enriched in solid catalyst, and has a content in wax hydrocarbons that is less than the catalyst slurry feedstream; d) contacting the solid catalyst with a washing medium in a manner effective to displace some of the wax hydrocarbons and wash the solid catalyst; and e) treating the washed solid catalyst under conditions sufficient to convert the metallic component into a non-reactive form to generate non-reactive solids. The catalyst-containing slurry feedstream may be withdrawn at least in part from a hydrocarbon synthesis slurry bed reactor. The addition of the second feedstream to the catalyst slurry feedstream, when carried out in step b), may be done before and/or while passing the slurry stream though the separation unit in step c). In some embodiments, the contacting step d) may be carried out before or at the same time (e.g., in the same unit) as the separation step c); and in such cases, the liquid stream comprises a portion of the displaced wax hydrocarbons, and the retentate stream comprises washed catalyst solids. In other embodiments, the contacting step d) may be carried out after the separation step c). At least one of steps b) through e) includes adding heat, such as by direct or indirect heat transfer. The process may further include repeating steps b)-e) until a majority of the wax hydrocarbons are removed from the solid catalyst (preferably at least 80% removed; more preferably at least 90% removed; still more preferably at least 95% removed).

In some embodiments, step e) may be carried out at a temperature which is greater than the boiling point or end boiling point of the washing medium. When the second feedstream is used to dilute the slurry feedstream, step e) may be carried out at a temperature which is greater than the highest of the boiling points and end boiling points of the washing medium and the second feedstream. Step e) can be carried out at about atmospheric pressure or below; or less than about 140 kPa. Step e) can be carried out at a temperature between 205-900° C. The process may further comprise the following step f): removing at least a portion of the remaining hydrocarbons from the washed solid catalyst using a stripping gas. Step f) may be carried out before, during or after step e), preferably at the same time or in the same unit as step e).

In any of the process embodiments, the washing medium and/or the second feedstream may comprise a solvent or a distillate such as a diesel, naphtha, kerosene or any combination thereof, wherein the distillate is petroleum-based or synthesized. In alternate embodiments, the washing medium may comprise steam.

In any of the process embodiments, either (or both) of the second feedstream and the washing medium comprises an organic solvent. In some embodiments, either (or both) of the second feedstream and the washing medium has a boiling point or an end boiling point which is less than the temperature used in the oxidative treatment step. In some embodiments, either (or both) of the second feedstream and the washing medium comprises a viscosity-reducing organic solvent, i.e., an organic solvent that can reduce the viscosity of the catalyst slurry stream, or of the retentate slurry stream, or of the organic residue.

In any of the process embodiments, the solid catalyst may comprise a metallic component selected from the group consisting of cobalt, ruthenium, and combinations thereof. When the metallic component of the catalyst comprises cobalt, the solid catalyst may further comprise another element selected from the group consisting of silver, platinum, rhenium, boron, ruthenium, and combinations thereof.

In any of the process embodiments, the oxidative treatment may comprise or may be characterized by a calcination step.

Another embodiment of the present invention relates to an integrated process for producing hydrocarbons and recovering spent solid catalyst, wherein the integrated process comprises the following steps: a) contacting a hydrocarbon synthesis solid catalyst with a feedstream comprising carbon monoxide and hydrogen in a reaction zone under conversion promoting conditions to produce one or more hydrocarbons, wherein the hydrocarbon synthesis solid catalyst comprises a metal, and further wherein a deactivation of said solid catalyst takes place over time within said reaction zone to form spent solid catalyst; b) withdrawing at least a portion of the hydrocarbon synthesis solid catalyst from the reaction zone to provide a slurry feedstream comprising liquid hydrocarbons and solids, wherein the slurry solids comprising at least a portion of the spent solid catalyst; c) optionally, performing at least one step selected from the group consisting of: adjusting the hydrocarbon content of said slurry feedstream; adjusting the hydrocarbon composition of said slurry feedstream; adjusting the solids content of said slurry feedstream, and combinations thereof; d) separating the slurry feedstream into a liquid stream and a solids-enriched stream, wherein the liquid stream comprises most of the liquid hydrocarbons, and further wherein the solids-enriched stream comprises spent solid catalyst and remaining hydrocarbons; e) treating the solids-enriched stream under oxidative conditions sufficient to oxidize the catalyst metal to a non-zero oxidation state and optionally to remove the remaining hydrocarbons in order to generate oxidized metal-containing solids; and f) collecting the oxidized metal-containing solids for reclamation. Step a) may be carried out in a slurry bed reactor, such as a slurry bubble column reactor. The collecting step f) may comprise transporting the solids on a cooling conveyor. Step c) is preferably carried out before step d).

Another aspect of the present invention relates to an apparatus for recovering a solid catalyst, wherein the solid catalyst is at least partially spent and comprises at least one metallic component and an organic residue. The apparatus comprises a solid/liquid separation unit and an oxidation unit. The separation unit preferably facilitates the separation of a catalyst slurry stream into a catalyst-enriched stream that is lean in organic residue and a liquid stream lean in catalyst solids. The solid-liquid separation unit is thus configured to receive the catalyst slurry stream, to separate the catalyst slurry stream in a liquid stream and a solid-enriched slurry retentate, and to optionally remove at least a portion of the organic residue. The separation unit may further include a means for applying a washing medium to said catalyst solids while they are in the separation unit. The means for applying a washing medium may include an inlet configured to feeding intermittently or continuously a washing medium to the separation unit. In some embodiments, the solid-liquid separation unit may comprise a unit selected from the group consisting of rotary filter, cross-flow filter, cake filter, belt filter, leaf filter and combinations of two or more thereof. In some embodiments, the solid-liquid separation unit may comprise a rotary drum filter. The oxidation unit preferably facilitates the conversion of the metallic component of the solid catalyst into a non-reactive form (e.g., in a non-zero valent form; in one or more oxide forms) of the metallic component. The separation unit is preferably upstream of the oxidation unit, so that at least a portion of the catalyst-enriched stream exiting the solid/liquid separation unit is fed to the oxidation unit. The oxidation unit is thus configured to receive at least a portion of the catalyst-enriched slurry retentate and to further contact the catalyst solids from the retentate with an oxidizing gas to generate oxidized metal solids. The oxidation unit may be further configured to facilitate the removal of remaining organic residue from the solid catalyst loaded in the oxidation unit. The oxidation unit is in fluid communication with the solid-liquid separation unit by a connection means which allows at least a portion of the catalyst-enriched slurry retentate to be directed from the solid-liquid separation unit to the oxidation unit. In some embodiments, the oxidation unit may include a means for heating.

In some alternative or additional embodiments, the organic residue comprises an organic liquid which is comprised in the dispersing liquid of the slurry. The process can be effective in removing most of the organic liquid from the catalyst slurry.

In some alternative or additional embodiments, the organic residue comprises an organic layer or film embedded and/or adsorbed in the structure of the solid catalyst (e.g., on surface and/or in pores). The process can be effective in removing most of the organic layer or film from the catalyst structure.

In some embodiments, the organic residue comprises wax hydrocarbons. These and other embodiments, features and advantages of the present invention will become apparent with reference to the following detailed description and drawings.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

Figure 1:
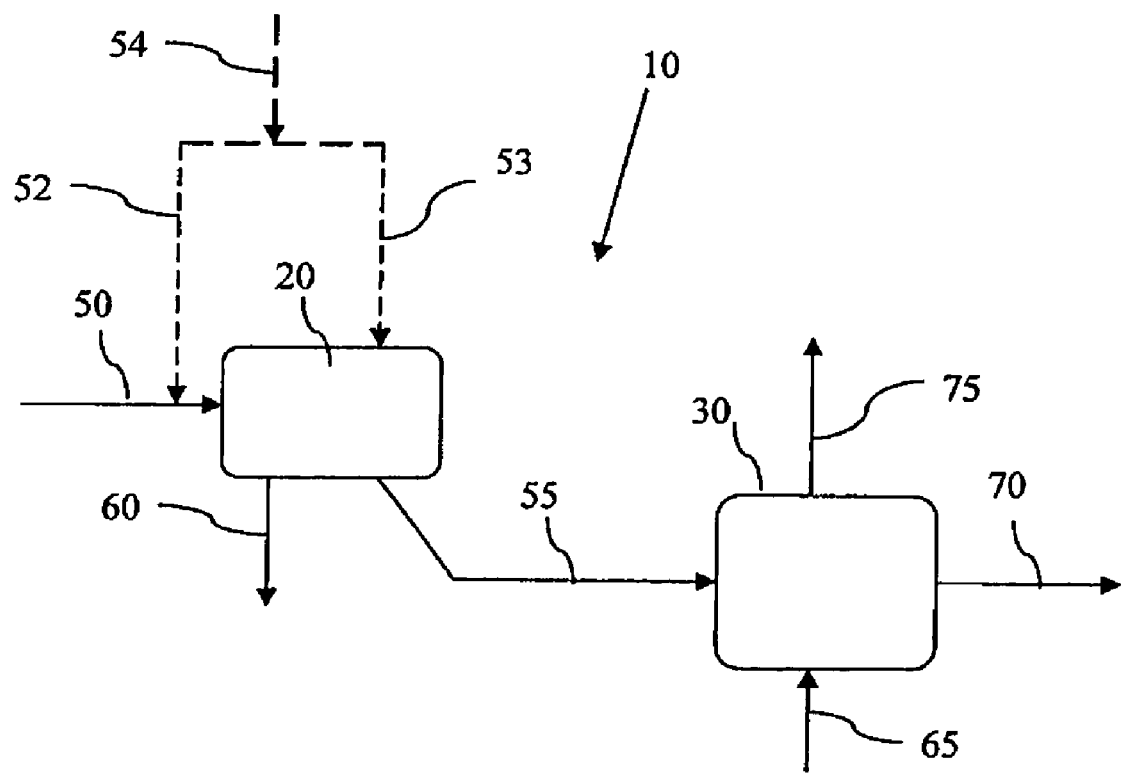
FIG. 1 represents a process flow diagram of an embodiment of a catalyst recovery process according to the present invention comprising a separation unit and an oxidation zone.

In the description that follows, like parts are marked throughout the specification and drawings with the same reference numerals, respectively. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results.

Specifically, the catalyst recovery process and system of the present invention may be used with any suitable catalyzed synthesis reaction in which the catalyst needs to be cleaned of organic residue prior to subsequent processing.

In one embodiment, the catalyst recovery process and system of the present invention are integrated with a synthesis reaction for producing hydrocarbon liquids from hydrocarbon gas, for example a Fischer-Tropsch synthesis reaction or an alcohol (e.g., methanol) synthesis reaction.

In another embodiment, the catalyst recovery process and system of the present invention are integrated with a Fischer-Tropsch synthesis reaction for converting syngas to hydrocarbon liquids via contact with a Fischer-Tropsch catalyst. The remainder of the detailed description will focus on this embodiment with the understanding that the present invention may have broader applications.

In moving-bed systems such as slurry-bed, fluidized-bed or slurry bubble column reactors for the conversion of synthesis gas into hydrocarbons and/or alcohols, the catalytic bed comprises a catalyst solid population of varying age. In these systems, a small portion of the catalyst solids may be continuously removed from the moving-bed system and replaced by fresh, regenerated and/or rejuvenated catalyst solids. Hence, a slurry stream exiting a slurry bed reactor or alternatively the whole slurry content therefrom, either of which may be processed according to the present invention, may comprise a diverse population of catalyst solids of varying activity. Some catalyst solids might be more than 15% deactivated while others might have about similar activity as fresh catalyst solids.

In some embodiments, a "catalyst in need of reclamation" may be a catalyst that has experienced a loss of more than about 10 percent, and more preferably of more than 15 percent, of its initial activity level. In other embodiments, a "catalyst in need of reclamation" may be a catalyst that has an average activity loss of from about 1 to about 15 percent less of its initial activity level. In yet alternate embodiments, a "catalyst in need of reclamation" may be a catalyst that has an average activity loss of from about 5 to about 10 percent less of its initial activity level.

As used herein, a "retentate stream" or "retentate" refers generally to a solids-enriched stream that is generated as a result of the solid-liquid separation. That is to say, the solid-separation system is not limited to a filtration unit, as any type of separation technique which can provide an increased in solid content in the "retentate stream" will be suitable for use in the present invention.

As used herein, an "organic residue" in a catalyst slurry stream or slurry feedstream generally refers to an organic liquid in which the solid catalyst is dispersed, or an organic layer or film on or inside the solid catalyst structure, or a combination thereof. It is to be understood that, when the organic residue comprises both an organic liquid and an organic layer, the composition of the organic liquid and the organic layer may be similar or different. In some embodiments, the organic layer may have a higher melting point and/or a higher end boiling point than the organic liquid. In some embodiments, the organic layer and the organic liquid may have relatively similar composition, or similar boiling range, or similar melting point. The organic layer on and/or inside the solid catalyst structure may be solidified organic compounds which coat the porous surface, or may be molten organic compounds which are adsorbed and/or embedded inside the porous structure of the solid catalyst.

As used herein, "catalyst slurry" refers generally to a dispersion of catalyst solids into a dispersing liquid phase. The dispersing liquid phase typically comprises an organic liquid, but may further comprise entrapped gas, and/or a non-organic liquid such as water or an aqueous liquid. In some embodiments, the dispersing liquid phase comprises wax hydrocarbons. In some embodiments, the dispersing liquid phase comprises synthesized hydrocarbons.

As used herein, the terms "hydrocarbon wax" or "wax hydrocarbons" are defined as a mixture of hydrocarbons typically comprising a number of carbon atoms equal to or greater than 20 (i.e., $C_{20+}$ hydrocarbons). A "hydrocarbon wax" may comprise an initial boiling point between about 600° F. and about 650° F. (about 315-343° C.). A "hydrocarbon wax" may further comprise some hydrocarbons with a number of carbon atoms less than 20 (i.e., $C_{20-}$ hydrocarbons), such as components boiling in a diesel range. The hydrocarbon wax in a catalyst slurry may be in the form of a molten liquid comprising a part of or consisting essentially of the dispersing liquid in which the catalyst solids are dispersed, and/or in the form of a layer or film covering at least a portion of (or all of) the structures of the catalyst solids. The composition of the hydrocarbon wax may differ whether it is in the form of a molten liquid or in the form of a 'solidified' layer or film on the solid structures. For example, the hydrocarbon wax in the form of a molten liquid may have a lower end boiling point than the hydrocarbon wax in the form of a 'solidified' layer. In some cases, the hydrocarbons present in the molten hydrocarbon wax may have on average a lower number of carbon atoms in their carbon backbone than the hydrocarbon wax layer.

One aspect of the present invention relates to a process for recovering a spent solid catalyst from a slurry may comprise the following steps: recovery of a catalyst-enriched stream which is lean in organic residue and a treatment to convert the metallic component into a non-reactive form. The recovery step preferably precedes the treatment step; and at least a portion of the recovered catalyst-enriched stream is then treated.

In preferred embodiments of the process, the solid catalyst is recovered from a catalyst slurry which comprises metal-containing catalyst solids and hydrocarbon wax. In such embodiment, the process can include passing the catalyst slurry feedstream through a solid-liquid separation unit to generate a liquid stream and a retentate stream, wherein the retentate stream is enriched in solids and leaner in hydrocarbon wax; carrying out one or both of the following steps selected from the group consisting of: 1/adding a second feedstream (e.g., solvent) to the catalyst slurry feedstream prior to entering the separation unit; and 2/adding a washing medium to the solid-liquid separation unit while passing the catalyst slurry feedstream therethrough; treating the retentate stream or the washed solids to generate oxidized washed solids; and collecting the oxidized washed solids. The retentate stream may comprise the majority of the washed catalyst solids, but may also comprise a portion of the washing medium and/or second feedstream, and some remaining hydrocarbon wax. The content in hydrocarbon wax in the retentate stream should be less than the hydrocarbon wax content of the catalyst slurry feedstream. The liquid stream preferably comprises a majority of the hydrocarbon wax displaced from the catalyst slurry feedstream. The liquid stream may further comprise the remainder of the washing medium and/or second feedstream. Treatment of the retentate stream or washed solids is preferably carried out under oxidative conditions that include subjecting the washed catalyst solids (or the retentate stream) to oxidizing conditions in a manner effective to convert the catalyst metallic component into a non-reactive form. The non-reactive form of the metallic component(s) may comprise one or more oxide forms and/or a sulfided form of the metallic component(s). The treatment conditions may include passing an oxidizing gas over the washed catalyst solids (or retentate) or exposing the washed catalyst solids (or retentate) to an oxidizing atmosphere. The treatment step may further include applying heat to the washed catalyst solids (from the retentate stream) which are loaded into the oxidation unit in a manner effective to remove a substantial portion of the remaining hydrocarbon wax which may be present in the liquid portion of the retentate stream and/or on the structures of the washed catalyst solids. In preferred embodiments, the heat application can be carried out while subjecting the washed catalyst solids to oxidizing conditions. The treatment step may comprise or may be characterized by a calcination step.

Referring initially to FIG. 1 a catalyst recovery system 10 according one embodiment of the present invention comprises a catalyst separation unit 20 and an oxidation unit 30. As described below, any suitable solid/liquid separation unit, means, solid/gas separation unit or combinations thereof may be employed as catalyst separation unit 20 and any suitable oxidation means can be employed as oxidation unit 30. The catalyst separation unit 20 comprises an inlet through which a slurry stream 50 is fed, a retentate outlet through which a retentate stream 55 exits and a filtrate outlet through which a liquid filtrate 60 exits. Separation unit 20 may further comprise an additional inlet through which a washing medium 53 is fed. The oxidation unit 30 comprises a retentate inlet through which at least a portion of retentate stream 55 is fed, an outlet through which an oxidized solid catalyst 70 exits and a gas outlet through which an off-gas 75 exits. Oxidation unit 30 may further comprise an additional inlet through which an oxidizing gas 65 is fed. The oxidation unit 30 is in fluid communication with the solid-liquid separation unit 20 by a connective element which allows at least a portion of the catalyst-enriched slurry retentate 55 to be directed from the solid-liquid separation unit 20 to the oxidation unit 30. For example, the retentate outlet of unit 20 is connected to the retentate inlet of unit 30 by suitable connection means (e.g., pipes, tubes, conduit) to provide fluid communication between oxidation unit 30 and catalyst separation unit 20, and preferably from catalyst separation unit 20 to oxidation unit 30. Specifically the suitable connection means allows at least a portion of the retentate stream 55 to flow from separation unit 20 to oxidation unit 30. In some embodiments, the oxidation unit 30 may include a means for heating, such as electric heater, fired heater (such as furnace, gas-fired heater), hot-oil heater, steam injection nozzle(s), heat exchanger such as one or more heating coils, one or more heating tubes, or heating jacket, wherein the heat exchanger may use steam (such as high-pressure steam) as heating medium. A means for heating selected from the group consisting of an electric heater and a fired heater is preferred in oxidation unit 30. The means for heating may be configured to increase the temperature of the retentate stream as it passes through the oxidation unit 30.

Catalyst slurry stream 50 feeds catalyst separation unit 20. Optionally, a second feedstream 52 (shown in dotted line) is added to catalyst slurry stream 50 before entering separation unit 20. As catalyst slurry stream 50 (which is optionally diluted with second feedstream 52) passes through separation unit 20, it gets separated into a retentate stream 55 and in a liquid filtrate 60. Additionally or alternatively, washing medium 53 can be added to separation unit 20 in order to facilitate the separation process or to improve its efficiency. Washing medium 53 and second feedstream 52 may be provided as split-streams of a source 54 (as illustrated in FIG. 1), that is to say, the compositions of washing medium 53 and second feedstream 52 are similar. Alternatively, washing medium 53 and second feedstream 52 may be provided by different sources (not illustrated), that is to say, the compositions of washing medium 53 and second feedstream 52 may be different.

Catalyst slurry stream 50 comprises an organic residue and solid catalyst. The organic residue in catalyst slurry stream 50 typically comprises an organic liquid in which the solid catalyst is dispersed, and may further include an organic layer or film on or inside the solid catalyst structure. If the organic residue comprises a wax component, catalyst slurry stream 50 is preferably maintained at a temperature sufficient to maintain its wax component in a molten state. Catalyst slurry stream 50 is preferably taken from a Fischer-Tropsch reactor as described in detail below, and more preferably from a slurry bubble column reactor containing a Fischer-Tropsch catalyst. The solids content in catalyst slurry stream 50 may comprise from about 5 percent by weight (wt %) to about 40 wt % of the total weight of the slurry. In some preferred embodiments, the solids content in catalyst slurry stream 50 is between about 5 wt % and about 30 wt % of the total weight of the slurry; and more preferably between about 10 wt % and about 25 wt % of the total weight of the slurry.

In preferred embodiments of FIG. 1, catalyst slurry stream 50 is drawn from a reaction vessel, preferably from a slurry bed reactor such as a slurry bubble column reactor, and more preferably from a Fischer-Tropsch slurry bed reactor. Catalyst slurry stream 50 may be provided directly 'as is' from a reaction vessel to the separation unit 20; alternatively, catalyst slurry stream 50 may be diluted for example with second feedstream 52 to change the slurry solid content, the slurry organic residue content (such as the slurry hydrocarbon content), the composition of the dispersing liquid phase in the slurry, or any combination thereof. In some embodiments, second feedstream 52 can include catalyst fines or other materials. Catalyst slurry stream 50 may be provided continuously from any unit in a hydrocarbon synthesis process (such as employing the Fischer-Tropsch synthesis), or may be provided in a batch mode or semi-batch mode, for example from one or more storage tanks, surge tanks or holding tanks.

In some embodiments, second feedstream 52 can be added to the catalyst slurry stream 50 before the catalyst slurry stream 50 is fed to the separation unit 20. In some embodiments, second feedstream 52 can be added to the catalyst slurry stream 50 at the same time the catalyst slurry stream 50 is fed to the separation unit 20, i.e., the mixing of the slurry and the second feedstream is done at the slurry inlet of the separation unit 20 or immediately after the separation unit slurry inlet.

In some embodiments, second feedstream 52 can be added to dilute heavy organic components in the catalyst slurry stream 50 in order to displace them with lighter ones, thus lowering the boiling point of the organic-containing dispersing liquid phase. In alternate embodiments, second feedstream 52 may be added to catalyst slurry stream 50 in order to displace at least some of the organic residue from the solid (catalyst) surface and dissolve the displaced organic residue into the now-diluted organic-containing dispersant liquid phase of catalyst slurry stream 50. In another embodiment, second feedstream 52 may be added to adjust the solids content of catalyst slurry stream 50. In some embodiments, second feedstream 52 may be added to improve the slurry flowability (such as by reducing the viscosity of catalyst slurry stream 50). Additionally or alternatively, second feedstream 52 may be added to catalyst slurry stream 50 to improve the transportability (pumpability) of the slurry stream 50 to separation unit 20. In yet other embodiments, second feedstream 52 may be added to adjust the slurry temperature to a more desirable range before catalyst slurry stream 50 is fed to separation unit 20. Second feedstream 52 can be added to slurry stream 50 to achieve one or more of the expected effects listed herein.

With regard to the composition of washing medium 53, any description pertaining to the selection of second feedstream 52 is equally applicable to washing medium 53. The compositions of washing medium 53 and second feedstream 52 may be the same, but not necessarily. The compositions of washing medium 53 and second feedstream 52 may be different. The criteria of selection of what to use in second feedstream 52 and in washing medium 53 is dictated by their intended use and the temperature range used in the subsequent processing step, i.e., the oxidative treatment in unit 30.

With regard to the composition of source 54, any description pertaining to the composition of second feedstream 52 is equally applicable to source 54. Although source 54 is shown as supplying both washing medium 53 and second feedstream 52, it is envisioned that washing medium 53 and second feedstream 52 could have different sources. For example, second feedstream 52 may comprise a middle distillate such as a diesel (either petroleum-based or synthesized), and washing medium 53 may comprise a low-boiling point distillate such as a naphtha or kerosene (either petroleum-based or synthesized).

Any of the following streams: second feedstream 52, washing medium 53, or source 54, may comprise a solvent. The solvent used in these streams 52, 53, 54 may be any hydrocarbon fluid (preferably hydrocarbon liquid). The solvent preferably has a boiling point or an end boiling point which is below the temperature used in the later oxidation step in oxidation unit 30, since oxidation unit 30 could be used to strip off the solvent surrounding the solid catalyst and/or remaining on the solid catalyst.

Any (or all) of the following streams: second feedstream 52, washing medium 53, or source 54, may a boiling point range which overlaps that of the organic residue, wherein the high portion of the boiling point range of any of (or all) of streams 52, 53, 54 overlap the low portion of the boiling point range of the organic residue. In alternate embodiments, the organic residue in slurry 50 and any of (or all) of streams 52, 53, 54 do not have overlapping boiling ranges. In some embodiments, any of (or all) streams 52, 53, 54 has a lower non-overlapping boiling range than the organic residue.

Any of the following streams: second feedstream 52, washing medium 53, or source 54, preferably comprises a hydrocarbon liquid stream including at least one hydrocarbonaceous compound having a carbon number greater than about 5 but having a boiling point not greater than about 650° F. (about 345° C.). Preferably, any of streams 52, 53 or 54 comprises a mixture of hydrocarbonaceous compounds which may be selected from any suitable source such as a fraction or portion of a Fischer-Tropsch liquid product from one or more Fischer-Tropsch reactors; a liquid fraction from a product upgrading unit; or any hydrocarbon stream in the $C_5$ to $C_{11}$ range, preferably in the $C_5$ to $C_9$ range or the $C_6$ to $C_9$ range. Any of (or all of) streams 52, 53 or 54 preferably comprises naphtha, diesel, natural gas liquids (NGL), or any combination thereof. Middle cut hydrocarbons, such as in the diesel boiling range between an initial boiling point between about 300° F. and about 350° F. (about 150-175° C.) and an end boiling point between about 650° F. and about 700° F. (about 340-370° C.) are more preferred components of any of (or all of) streams 52, 53 or 54.

A heavy middle distillate, preferably comprising an initial boiling point between about 400° F. and about 450° F. (between about 205 and about 230° C.) and an end boiling point between about 650° F. and about 700° F. (about 340-370° C.), may also be used as part of or all of any of streams 52, 53 or 54. A light middle distillate, which comprises an initial boiling point about 300° F. and about 350° F. (about 150-175° C.) and an end boiling point between about 400° F. and about 450° F. (between about 205 and about 230° C.), may also be used as part of or all of any of streams 52, 53 or 54. Other solvent materials suitable as a part of or all of any of streams 52, 53 or 54 may be one or more alcohols, one or more ketones, acetone, one or more esters, or mixtures thereof. The one or more alcohols may comprise those obtained and recovered from the reactor vessel from which the catalyst slurry stream 50 is removed. For example, the one or more alcohols may comprise a Fisher-Tropsch oxygenates product stream.

In most preferred embodiments, any of streams 52, 53 or 54 comprises at least a portion of or a fraction of a Fischer-Tropsch liquid product; most particularly a Fischer-Tropsch naphtha. In this regard the present invention is not limited to using Fischer-Tropsch liquid products, however, and can be used with any hydrocarbon liquid exhibiting beneficial properties taken from any readily available source, including product storage tanks if necessary. Likewise, while any of streams 52, 53 or 54 is described herein as comprising diesel, it should be understood that any suitable solvent or combination of solvents may be used, since it is envisioned that any of streams 52, 53 or 54 may also comprise lighter hydrocarbons, such as Fischer-Tropsch naphtha hydrocarbons with a boiling range between about 70° F. and about 350° F. (about 20-175° C.) and comprising between about 5 and 9 carbons, with some minor content of hydrocarbons having more than 9 carbons or fewer than 5 carbons.

At the point where second feedstream 52 is added to catalyst slurry stream 50, a valve may be used to regulate the amount of solvent added. In some embodiments, the amount (e.g., volume) of added second feedstream 52 can vary between 5% and 200% of the volumetric flow rate of the catalyst slurry stream 50. In alternate embodiments, the amount (e.g., volume) of added second feedstream 52 can vary between 10% and 80% of the volumetric flow rate of the catalyst slurry stream 50. In some embodiments, the ratio of volumetric flow rate of the second feedstream 52 to volumetric flow rate of slurry stream 50 can be between about 0.5:1 and about 2:1.

Slurry stream 50 preferably has a temperature of about 200° F. to about 550° F. (about 90-290° C.), more preferably about 320° F. to about 550° F. (about 160-290° C.), and still more preferably about 320° F. to about 480° F. (about 160-250° C.). If a second feedstream 52 is added to dilute slurry stream 50, second feedstream 52 is preferably warm enough to prevent crystallization of any heavy component (e.g. hydrocarbon wax) present in slurry stream 50. The temperature of second feedstream 52 is preferably equal to or higher than that of slurry stream 50 before combining. If second feedstream 52 has an initial temperature below the desired temperature range, second feedstream 52 may be preheated, for example, by heat exchange with steam or with another process stream in a heater, or by any other suitable means for increasing the temperature of diluted slurry stream obtained herein within a desirable range. Preferably, the temperatures of both slurry stream 50 and the second feedstream 52 added to slurry stream 50 are high enough to prevent crystallization of wax component.

Catalyst slurry stream 50 which comprises finely-divided solids (i.e., catalyst particles), an optional second feedstream 52 (e.g., solvent, naphtha, and/or diesel), and organic residue is fed to the separation unit 20 to be separated into retentate stream 55 and liquid filtrate 60. Separation unit 20 may comprise any solid/liquid separation system, such as a settler, a hydrocyclone, a filter or any combination of two or more thereof.

As the slurry stream 50 passes through separation unit 20, washing medium 53 can be added to separation unit 20 in order to improve its efficiency. In some embodiments, washing medium 53 can be added to separation unit 20 in order to displace and/or dissolve into the liquid phase at least some of the organic residue which is adsorbed onto and/or embedded in the solid (catalyst) surface. As a result, a spent washing medium carries the displaced and/or dissolved organic residue. Spent washing medium is mainly recovered via liquid filtrate 60; but a small portion of spent washing medium can be retained into retentate stream 55, since it is expected that the separation technique used in unit 20 is mainly effective in liquid-solid separation and may not necessarily be effective in liquid-liquid separation.

Figure 2:
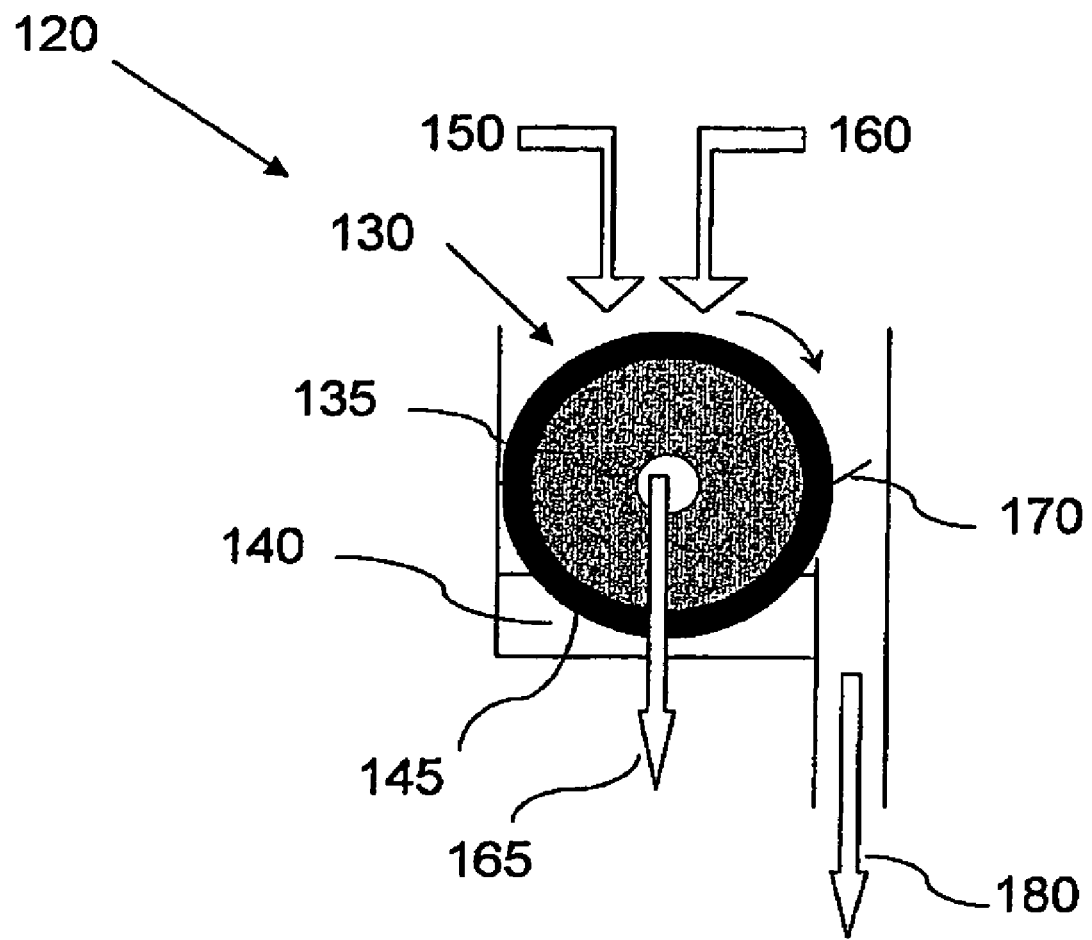
FIG. 2 illustrates one means of removing wax hydrocarbons from a catalyst slurry stream for the recovery of a more concentrated catalyst stream according to one embodiment of the present invention.

In certain embodiments, separation unit 20 comprises a filter (not shown). A suitable filter system 120 for use in separation 20 is illustrated in FIG. 2 and described in detail below. The filter preferably is aided by a filter substrate through which the separation takes place. Second feedstream 52 can be added to the slurry stream 50 at a point just prior to the filter in separation unit 20. Additionally or alternatively, washing medium 53 can be added to the filter as a separate feedstream, in order to wash catalyst solids that are retained on the filter substrate. The washing medium 53 can wash the organic residue off the retained catalyst by displacing most of the organic residue (by partitioning).

In alternate embodiments (not illustrated), a plurality of filters may be placed in series in separation unit 20 to subject the catalyst slurry stream 50 to a multi-staged filtration process. In each stage of the multi-stage process, a plurality of second feedstreams may be added to the slurry stream feeding a downstream filter at a point just prior to entering it, such that the 'diluted' slurry stream passes through the filter, wherein it is separated into a liquid filtrate and a slurry retentate. The slurry retentate together with added second feedstream provides the slurry feedstream to the next filter. At each point where a second feedstream is added to the slurry stream, valves can regulate the amount of second feedstream added. The filtration stages are set up in series so that substantially all of the organic residue (e.g., waxy hydrocarbons) has been removed from the catalyst exiting the last filter. In some embodiments where the process removes organic residue (comprising a wax) from metal-containing catalyst solids with a diesel as the second feedstream, separation unit 20 could comprise at least 2 filtering stages in series, preferably at least 3 filtering stages in series, more preferably at least about 5 filtering stages in series.

As shown in FIG. 1, retentate stream 55 and liquid filtrate 60 exit separation unit 20. Retentate stream 55 comprises washed solid catalyst. Liquid filtrate 60 comprises most of the organic residue. Liquid filtrate 60 further comprises most of the added optional second feedstream, and most of the added washing medium. Although not illustrated in FIG. 1, liquid filtrate 60 can be sent for subsequent fractionation, or refining and upgrading, for example for generating salable products from the displaced organic residue and/or for recovering some of or all of the components of the second feedstream 52 and/or washing medium 53 for recycling to system 10. The content of organic residue in retentate stream 55 is preferably less than about 10% of the original content of organic residue present in catalyst slurry stream 50; preferably between about 0.5 and 10%; more preferably between about 2 and 8%.

Still referring to FIG. 1, retentate stream 55 is fed to oxidation unit 30 to load the washed catalyst solids into unit 30. Retentate 55 could be transferred from separation unit 20 to oxidation unit 30 by gravity, a screw conveyor, a belt or any other suitable conveying means. The load of washed solid catalyst can be contained in trays or saggers in unit 30; or may flow freely in unit 30, depending on the configuration of oxidation unit 30.

Oxidation unit 30 may comprise a rotary calciner, fluidized bed calciner, box furnace, tunnel kiln, or other equipment capable of being heated to at least 900° C.

In oxidation unit 30, the washed catalyst load is subjected to oxidizing conditions. The oxidizing conditions in oxidation unit 30 may include passing an oxidizing gas 65 over the washed catalyst load (as illustrated in FIG. 1); or exposing the washed catalyst load to an oxidizing atmosphere (not illustrated).

The temperature in oxidation unit 30 is preferably greater than the boiling point of the washing medium 53 used in separation unit 20. In alternate embodiments, the temperature in oxidation unit 30 is at least greater than the end boiling point of the washing medium (when the washing medium 53 comprises a mixture of components). The temperature in oxidation unit 30 is preferably at least 10° C. greater than the boiling point or the end boiling point of the washing medium 53, more preferably at least 15° C. greater; still more preferably at least 20° C. greater. In an embodiment where the washing medium 53 is naphtha with an end boiling point typically around 350-370° F. (about 175-190° C.), the temperature in oxidation unit 30 is greater than about 400° F. (above about 205° C.), preferably from about 400° F. to about 1,650° F. (about 205° C. to about 900° C.); more preferably from about 480° F. to about 1,110° F. (about 250° C. to about 600° C.). In an alternate embodiment where the washing medium 53 is diesel with an end boiling point typically around 650-700° F. (about 340-370° C.), the temperature in oxidation unit 30 is at least greater than 700° F. (about 370° C.), preferably from about 750° F. to about 1,650° F. (about 400° C. to about 900° C.); more preferably from about 750° F. to about 1,400° F. (about 400° C. to about 760° C.); still more preferably from about 750° F. to about 1,110° F. (about 400° C. to about 600° C.). In some embodiments, the temperature in oxidation unit 30 is between about 400° C. and about 900° C. Another suitable temperature range in oxidation unit 30 is between about 450° C. and about 600° C.; more preferably between about 450° C. and about 550° C. In some embodiments, the temperature in oxidation unit 30 is such that substantially all of the washing medium 53 and remaining organic residue are stripped off from the loaded solid catalyst and exit oxidation unit 30 along with the unused oxidizing gas via off-gas 75. In some embodiments when the second feedstream 52 is added to the catalyst slurry 50, the temperature in oxidation unit 30 is greater than the higher of both boiling points (or end boiling points) of the washing medium 53 and the second feedstream 52; preferably at least 10° C. greater; more preferably at least 15° C. greater; still more preferably at least 20° C. greater.

Suitable operation conditions for oxidation unit 30 may further comprise a pressure between 0 psi and about 75 psi (0- about 515 kPa). Any pressure below 140 kPa or below 110 kPa is preferred for use in oxidation unit 30. A suitable pressure range in oxidation unit 30 is between pseudo-vacuum and slightly above atmospheric pressure (for example from 0.01 psi to 20 psi or between 0.07 kPa and 140 kPa; alternatively from 0.01 psi to 16 psi or between 0.07 kPa and 110 kPa).

Suitable operation conditions for oxidation unit 30 may further comprise a solid residence time between about 0.5 hour and about 24 hours. A preferred solid residence time in oxidation unit 30 is between about 1 hour and about 12 hours; more preferably between about 1 hour and about 6 hours; still more preferably between about 1 hour and about 3 hours.

Treatment of the washed catalyst load in oxidation unit 30 may further include applying heat to the washed catalyst load in a manner effective to remove a substantial portion of the remaining organic residue (e.g., hydrocarbon wax) which may still be present in the dispersing liquid of the retentate stream 55 and/or on the structure of the washed solid catalyst. In preferred embodiments, the heat application is done while subjecting the washed catalyst load to the oxidizing conditions.

The treatment of the washed catalyst from retentate stream 55 loaded in oxidation unit 30 may comprise or may be characterized by a calcination step.

In preferred embodiments, oxidizing gas 65 is fed to unit 30 and contact the washed catalyst load. The contact is carried for a period of time sufficient to convert at least a portion of the metallic components of the solid catalyst to one or more oxide forms. Optionally, the contact is further carried for a period of time sufficient to remove remaining organic residue and/or components of the washing medium 53 and optional second feedstream 52. An oxidized solid catalyst 70 and an off-gas 75 then exit oxidation unit 30. Most of the oxidizing gas 65 passes through unit 30 to be recovered in off-gas 75. Most of the solid catalyst loaded and subjected to oxidation in unit 30 is collected in oxidized solid catalyst 70.

Oxidizing gas 65 preferably enters the bottom of oxidation unit 30 and flows upward through the washed solid catalyst loaded in the oxidation unit 30. Alternatively, oxidizing gas 65 can enter oxidation unit 30 by a side inlet at one end of the oxidation unit 30 in order to flow across and/or sweep over the washed solid catalyst loaded in the oxidation unit 30. In such cases, oxidizing gas 65 flows from the side inlet to another end of unit 30, such as to the opposite end for a substantially horizontal flow or to the top end for a substantially oblique flow. In some embodiments, oxidizing gas 65 may comprise air, $O_2$-enriched air, substantially pure $O_2$, steam, $O_2$ diluted with nitrogen gas, air mixed with steam, or any other mixtures thereof. In preferred embodiments, oxidizing gas 65 may comprise, or may consist essentially of, diatomic oxygen ($O_2$), air, steam (such as superheated steam or high pressure steam), or mixtures thereof. Additionally or alternatively, oxidizing gas 65 may contain a vaporized fuel, such as an alkane, natural gas liquids, natural gas, hydrogen, or other combustible hydrocarbon. In alternate or additional embodiments, oxidizing gas 65 may contain a sulfur-containing compound, such as hydrogen sulfide, carbon disulfide, carbonyl sulfide, or any mixture of two of more thereof. Additionally or alternatively, oxidizing gas 65 may contain small amounts of other gases, such as carbon dioxide or nitrogen, but preferably does not contain any organic compound of the type being removed from the catalyst and/or from the dispersing liquid phase of the catalyst slurry.

Oxidizing gas 65 preferably flows over or through the catalyst load in unit 30. The oxidizing gas 65 may be introduced into oxidation unit 30 through convection (from ambient air coming in through a catalyst feeder system of a rotary calciner, for example), pipes, sparger tubes, hoses, or by a blower or other delivery systems compatible with the temperatures used during operation of unit 30.

The oxidation step may also be effective to remove components of the washing medium and/or second feedstream as well as remaining organic residue from the catalyst and/or from the slurry dispersing phase. The washed solid catalyst preferably has sufficient residence time in oxidation unit 30 not only to convert metallic components of the solid catalyst to a non-reactive form such as oxide form(s), but also to strip off the remaining organic residue (such as hydrocarbon wax or other hydrocarbon compounds). When steam is used as the oxidizing gas 65 or in conjunction with other oxidizing gas(es), the steam application is preferably continued so that the oxidized solid catalyst 70, that has been stripped of remaining organic residue is still damp when it leaves unit 30 in order to be transferred to a shipping container. Oxidized solid catalyst 70 may have a water content of up to 50 wt %, preferably between 25 and 35 wt %.

The concentration of oxygen in the oxidizing gas 65 may range from 0.1 to 100%. The oxidizing gas 65 preferably has a flow rate sufficient to provide stoichiometric amounts of diatomic oxygen ($O_2$) to oxidize the catalyst metallic component(s). If steam is used, its concentration in oxidizing gas 65 would be saturated for the temperature and pressure in unit 30. In alternate embodiments, the oxidizing gas 65 has a flow rate sufficient to provide stoichiometric amounts of S to convert the catalyst metallic component(s) into a metal sulfide. Residence time in unit 30 may range from 30 minutes to several days, depending on the configuration of unit 30 and the efficiency of contact of the oxidizing gas with the catalyst. (Typical residence time in a rotary calciner is 1 to 2 hours).

Under suitable operation of oxidation unit 30, the remaining organic residue and remaining components from the washing medium and optional second feedstream present in retentate stream 55 can be burned off (with $O_2$) and/or stripped off (with steam) from the washed catalyst load, while at the same time, any zero-valent metallic component (including catalytic metal) of the washed catalyst loaded in unit 30 is oxidized by oxidant gas 65 to a non-zero oxidation state. While the embodiment described herein combines the stripping and oxidation step, in other embodiments, the stripping and oxidation steps can be performed separately.

Off-gas 75 exiting oxidation unit 30 typically comprises an organic vapor of remaining organic residue, vaporized remaining components of the washing medium and/or of the optional second feedstream, and unspent oxidizing gas. Off-gas 75 may be sent to a gas plant (not shown) for further processing or to a gas/solid separation unit, for example for recovering some of or all of the vaporized remaining organic residue to generating salable products and/or for recovering some of or all of the components of the second feedstream 52 and/or washing medium 53 for at least in part recycling to system 10 (such as in unit 20).

If desired, the oxidized solid catalyst 70 may be cooled after exiting unit 30. The oxidized solid catalyst 70 can be collected into bags, railcars, truck tanks, boxes, containers, and the like by employing for example hoppers and/or flow bins, for disposal and/or shipment to a reclamation site.

FIG. 2 illustrates a rotary filtration unit 120 that can be used in separation unit 20 of FIG. 1 and solid/liquid separation unit 220 of FIG. 3 (described later). Rotary filtration unit 120 preferably comprises a rotary drum filter shown as 130 in FIG. 2. Slurry stream 150 is fed to the rotary filtration unit 120 on top of the rotary drum filter 130, while simultaneously a washing medium 160 is fed on top of the rotary drum filter 130.

The slurry stream 150 (such as stream 50 shown in FIG. 1 or stream 250 shown in FIG. 3) is separated by a porous substrate 135, such as cloth or other suitable media, which rotates through a slurry chamber 140. A pressure drop is applied across substrate 135 to cause the solid catalyst to accumulate on its external surface of the rotary drum filter 130 and form a catalyst-containing cake or solid layer 145 through which a liquid hydrocarbon filtrate 165 is drawn. Rotary drum vacuum filter 130 can be operated in a continuous manner.

Rotary filtration unit 120 is preferably designed to effect the production of a retentate stream 180 enriched in solid catalyst. Additionally, rotary filtration unit 120 may be designed to clean the solid catalyst deposited on the filter substrate 135 by contacting the catalyst-containing cake 145 with a washing medium 160 (which may be an organic solvent, a petroleum fraction, a synthetic hydrocarbon fraction, or combinations thereof).

With regard to the washing medium 160, any description pertaining to the selection/composition of second feedstream 52 or washing medium 53 is equally applicable to washing medium 160. The compositions of washing medium 160 and washing medium 53 may be the same, but not necessarily. The compositions of washing medium 53 and washing medium 160 may be different. The criteria of selection of what to use in washing medium 53 in unit 20 and in washing medium 160 in unit 120 is dictated by their intended use in their respective separation unit, as well as the temperature range used in the subsequent oxidative treatment. Washing medium 160 preferably comprises a light hydrocarbon liquid such as naphtha and/or diesel, preferably Fischer-Tropsch naphtha, diesel, or mixtures thereof.

Thus, the catalyst which exits unit 120 via retentate stream 180 may still include some organic residue (e.g., wax hydrocarbons) on the catalyst structure.

The rotary drum vacuum filter 130 can discharge its concentrated and washed catalyst cake by means of various discharge arrangements, such as a scraper 170 (shown), belt, or roll (not shown).

The operation of the rotary filtration unit 120 is preferably cyclic and continuous, in which each revolution of the rotary drum vacuum filter 130 includes cake formation, cake washing with washing medium 160, optional drying, and cake discharge, so that filtrate 165 (which is substantially catalyst-free) and retentate stream 180 exit rotary filtration unit 120. Retentate stream 180 is enriched in catalyst solids. Retentate stream 180 can provide, in part or in totality, the retentate stream 55 of the catalyst recovery system 10 of FIG. 1 or the catalyst-enriched retentate stream 255 of the catalyst recovery system 210 of FIG. 3 (described later). Filtrate 165 can provide, in part or in totality, the liquid filtrate 60 of the catalyst recovery system 10 of FIG. 1 or the filtrate stream 260 of the catalyst recovery system 210 of FIG. 3 (described hereinafter).

During operation of the rotary drum vacuum filter 130, an inert (i.e., non-reactive) gas, such as a sweep gas, may be used in the space surrounding the rotary drum vacuum filter 130 within rotary filtration unit 120. The presence of the inert gas in the space surrounding the rotary drum vacuum filter 130 should help in preventing the escape of any organic residue in vapor form to the atmosphere. Additionally, the inert gas may blanket the catalyst solids in order to prevent spontaneous oxidation of the metallic component(s) present in the solid catalyst with air. The inert gas may comprise nitrogen gas, tail gas (e.g., from a Fischer-Tropsch reactor vessel which typically comprises organic vapor with 5 or less carbon atoms, or from a hydroprocessing unit), argon, methane, or other relatively inert gas compositions not containing or substantially free of $O_2$ (for example less than 500 ppm $O_2$, preferably less than 100 ppm $O_2$). The inert gas or sweep gas may be at atmospheric pressure or above to maintain a pressure drop across filter substrate 135. The inert gas or sweep gas may also be used to carry away organic matter that may be volatized or vaporized during the filtration step.

Figure 3:
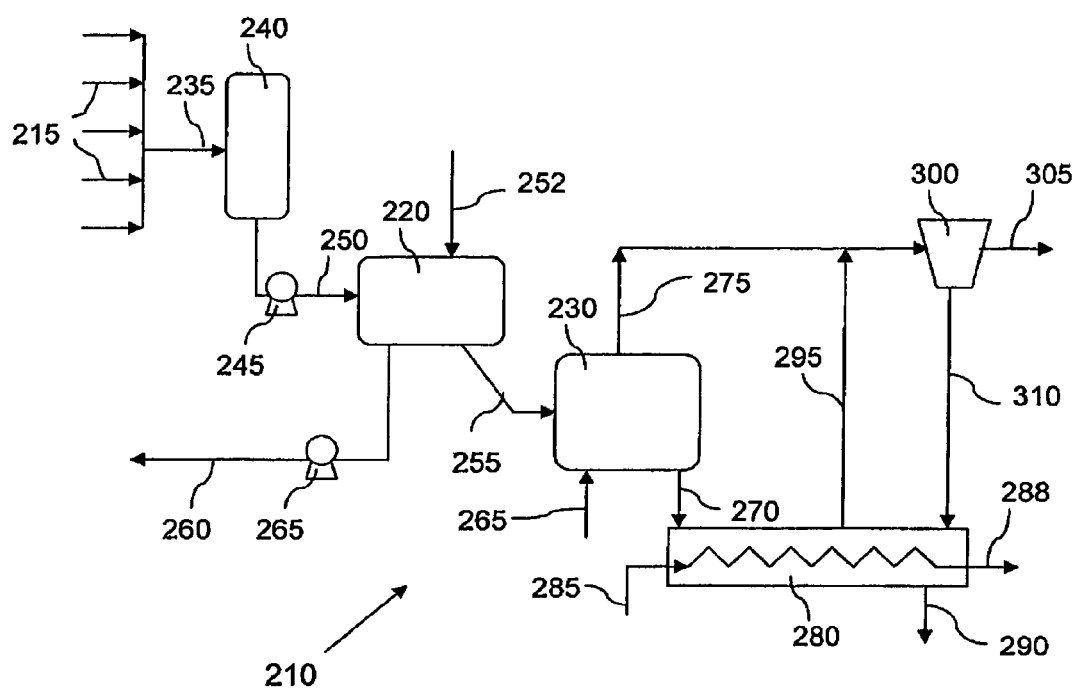
FIG. 3 represents a process flow diagram of another embodiment of a catalyst recovery process according to the present invention comprising a solid/liquid separation unit and a calcinations unit.

FIG. 3 illustrates a catalyst recovery system 210 for recovering metal-containing catalyst solids according to another embodiment of the present invention. The catalyst recovery system 210 comprises a solid/liquid separation unit 220; a calcination unit 230; a spent catalyst surge vessel 240; a conveyor 280 and optionally a dust collection system 300.

Any suitable solid/liquid separation unit, means, or combinations thereof may be employed as solid/liquid separation unit 220.

Catalyst slurry 235 feeds catalyst recovery system 210. Catalyst slurry 235 comprises a dispersing liquid and spent solid catalyst. The dispersing liquid in the spent catalyst slurry stream 235 typically comprises hydrocarbon wax in a molten state.

Spent catalyst slurry 235 can be provided from at least one hydrocarbon synthesis reactor or a plurality of hydrocarbon synthesis reactors (not shown). In some embodiments, catalyst recovery facility 210 can be fed by a manifold comprising slurry streams 215 (as illustrated) from multiple synthesis reactors (not illustrated), for example Fischer-Tropsch reactors. Therefore, overall operation of catalyst recovery facility 210 can be continuous by scheduling a single Fischer-Tropsch reactor to be shut down at a time for complete catalyst replacement and for spent catalyst recovery while all others are in operation. Alternatively, slurry streams 215 comprise spent catalyst from each of the operating reactors and can provide continually or continuously the spent catalyst slurry stream 235 to feed catalyst recovery facility 210. Operating in this manner could improve the economics for the use of a single catalyst recovery system such as catalyst recovery facility 210 according to the present invention.

In some optional embodiments, a second feedstream (not illustrated), similar to second feedstream 52 of FIG. 1 and described earlier, may be used to dilute one or more of the slurry streams 215. Alternatively a second feedstream may be used to dilute slurry streams 235.

In some embodiments, spent catalyst slurry stream 235 can be unloaded from at least one hydrocarbon synthesis reactor or a plurality of hydrocarbon synthesis reactors to one or more holding vessels (not illustrated).

Spent catalyst slurry stream 235, via one or more optional holding vessels (not shown), is intermittently or continuously sent to spent catalyst surge vessel 240. When a second feedstream is used to dilute slurry streams 235, the addition of the second feedstream can be done at any time which would be the most suitable for the operators of system 210. For example, the addition of the second feedstream may take place before its entry into spent catalyst surge vessel 240 or may be carried out in the spent catalyst surge vessel 240 after the slurry streams 235 is loaded into the spent catalyst surge vessel 240. In order to reduce capital costs, spent catalyst surge vessel 240 may be sized to hold less than the content of an entire hydrocarbon synthesis reactor vessel, and thus, each hydrocarbon synthesis reactor can be directly unloaded, in small batches, into the spent catalyst surge vessel 240. The optional holding vessel(s) and spent catalyst surge vessel 240 are preferably heated to keep waxes present in the liquid as well as the waxes adsorbed onto and/or embedded into the spent catalyst in a molten state. In addition, the spent catalyst slurry contained in spent catalyst surge vessel 240 and optional holding vessel(s) is preferably agitated (such as by gas-agitated means) in order to keep the particulate catalyst dispersed in the slurry dispersing liquid in order to prevent the particulate catalyst from settling to the bottom of the vessel(s). The agitation may be provided by supplying a fluidization gas to the bottom of the vessel(s) and/or by continuously circulating a portion of the vessel content (so as to create fluid turbulence within the vessel), for example with a re-circulating pump (not shown); or by other mixing means such as the use of one or more impellers controlled by a motor.

Spent catalyst slurry feedstream 250 withdrawn from spent catalyst surge vessel 240 is fed, for example by one or more pumps 245 or by gravity, to solid-liquid separation unit 220. Optionally, before entering solid-liquid separation unit 220, spent catalyst slurry stream 250 may be passed through a degasser (not shown) in order to remove any gas which may be entrained, entrapped and/or dissolved gas in spent catalyst slurry feedstream 250.

As spent catalyst slurry feedstream 250 passes through solid-liquid separation unit 220, it is separated into retentate stream 255 and filtrate 260. Filtrate 260 is substantially free of solids; wherein retentate stream 255 is enriched in solids. Additionally, a washing medium 252 is added to separation unit 220 to increase the efficiency of separation and further improve the displacement of hydrocarbon wax from the catalyst, as described earlier with washing mediums 53 and 160 of FIGS. 1 and 2, respectively.

In unit 220, any solid-liquid separation techniques may be used such as filtration, decantation, sedimentation, centrifugation, magnetic separation, or any combination thereof. For example, solid/liquid separation unit 220 could comprise a settler, a hydrocyclone, any magnetic separation unit, a centrifuge, a filter or any combination of two or more thereof. In preferred embodiments, solid/liquid separation unit 220 comprises a filter. Any suitable filter or filtration means may be used in unit 220 to separate the liquid and solid spent catalyst. The filter may be selected from the group consisting of rotary filters, cross-flow filters, cake filters, belt filters, leaf filters and combinations of two or more thereof.

In preferred embodiments, solid/liquid separation unit 220 comprises a rotary pressure filter such as filter 120 of FIG. 2, where the liquid wax is washed with washing medium 252 and filtered from the catalyst. Other filter types, such as belt filters and leaf filters can also be used for removing the wax.

Referring again to FIG. 3, filtrate 260 which comprises wax and washing medium is sent, for example via one or more pumps 265, to a product recovery vessel (not shown). A catalyst-enriched stream 255 exits the solid/liquid separation unit 220 and is discharged into calcination unit 230.

In preferred embodiments, calcination unit 230 is operated under oxidative conditions by adding an oxidizing gas 265 comprising diatomic oxygen ($O_2$), steam or combination thereof. Under suitable operation of calcination unit 230, the wax hydrocarbons present in solids-enriched retentate stream 255 can be burned off (with $O_2$) and/or stripped off (with steam) from the catalyst loaded into unit 230, while at the same time, the metallic component(s) (including metal promoter, catalytic metal or other metals) present in the spent catalyst in solids-enriched retentate stream 255 is oxidized by the oxidizing gas 265 to a non-zero oxidation state.

It should be noted that, once the hydrocarbon wax is removed from the solid catalyst in separation unit 220, solids-enriched retentate stream 255 may be sensitive to oxidation due to the presence of one or more metallic components in the solid catalyst (i.e., which are susceptible to spontaneous oxidation with $O_2$ and/or water). In preferred embodiments, the solid catalyst comprises finely-divided metallic crystallites of one or more catalytic metals, such as cobalt and/or ruthenium, or optional promoter metals (such as platinum, palladium, silver, rhenium, ruthenium, boron, and other known to those of ordinary skills in the art). The contact of these metallic components with oxygen ($O_2$) in a controlled hot environment in calcination unit 230 preferably results in oxidation of the metallic components. The conversion of the metallic components to oxide forms should reduce the risk of ignition that could result in a fire and could damage calcination unit 230.

In some embodiments, the oxidizing gas 265 does not comprise $O_2$, but comprises steam. In alternate embodiments, the oxidizing gas 265 excludes $O_2$ and consists essentially of steam.

Since the solid catalyst comprises small particles (typically from sub-micron range to about 500 microns, preferably from sub-micron range to about 200 microns; more preferably from sub-micron range to about 150 microns), some of the smaller particles could be easily carried over in off-gas 275 of calcination unit 230, thus there may be a significant loss of catalyst particles in the form of dust. Catalyst dust can be collected downstream in dust collector 300 which is described later. Catalyst dust can present handling difficulties due to its pyrophoric nature. Additionally, catalyst dust may increase the possibility of exposure to operators of the system 210. The use of steam in oxidizing gas 265 can solve many issues. Steam can effectively remove (by stripping) remaining hydrocarbon wax and washing medium from the washed solid catalyst. Steam can also effectively oxidize finely-divided metallic crystallites into oxide form, thus reducing the possible chemical instability of the solid catalyst recovered thereafter. Steam can further minimize the generation of catalyst dust by wetting the calcined solid catalyst. The wetting of the solid catalyst can quench the pyrophoric tendency of the recovered solid catalyst. The wetting of the solid catalyst would result in minimizing the carrying-over of catalyst solids into off-gas 275. A wet catalyst dust would also be easier to handle by operators and would pose less handling risk.

The temperature in calcination unit 230 is preferably greater than the boiling point of the washing medium used in separation unit 220. In alternate embodiments, the temperature in calcination unit 230 is at least greater than the end boiling point of the washing medium (when the washing medium comprises a mixture of components). The temperature in calcination unit 230 is preferably at least 10° C. greater than the boiling point or the end boiling point of the washing medium, more preferably at least 15° C. greater; still more preferably at least 20° C. greater. In an embodiment where the washing medium is naphtha with an end boiling point typically around 350-370° F. (about 175-190° C.), the temperature in calcination unit 230 is greater than about 400° F. (above about 205° C.), preferably from about 400° F. to about 1,650° F. (about 205° C. to about 900° C.); more preferably from about 480° F. to about 1,110° F. (about 250° C. to about 600° C.). In an alternate embodiment where the washing medium is diesel with an end boiling point typically around 650-700° F. (about 340-370° C.), the temperature in calcination unit 230 is at least greater than 700° F. (about 370° C.), preferably from about 750° F. to about 1,650° F. (about 400° C. to about 900° C.); more preferably from about 750° F. to about 1,400° F. (about 400° C. to about 760° C.); still more preferably from about 750° F. to about 1,110° F. (about 400° C. to about 600° C.). In some embodiments, the temperature in calcination unit 230 is between about 400° C. and about 900° C. Another suitable temperature range in calcination unit 230 is between about 450° C. and about 600° C.; more preferably between about 450° C. and about 550° C. In some embodiments, the temperature in calcination unit 230 is such that substantially all of the washing medium and remaining hydrocarbon wax are stripped off from the loaded solid catalyst and exit calcination unit 230 along with the unused oxidizing gas via calcination off-gas 275.

Suitable operation conditions for calcination unit 230 further comprise a pressure between 0 psi and about 75 psi (0- about 515 kPa); a solid residence time between about 0.5 hour and about 24 hours. A preferred solid residence time in calcination unit 230 is between about 1 hour and about 12 hours; more preferably between about 1 hour and about 6 hours; still more preferably between about 1 hour and about 3 hours. Any pressure below 140 kPa or below 110 kPa is suitable for use in calcination unit 230. A preferred pressure range in calcination unit 230 is between pseudo-vacuum and slightly above atmospheric pressure (for example from 0.01 psi to 20 psi or between 0.07 kPa and 140 kPa; alternatively from 0.01 psi to 16 psi or between 0.07 kPa and 110 kPa).

Catalyst retentate stream 255 preferably has a solids content of at least 70 wt %, preferably between about 70 wt % and about 95 wt %. In some embodiments, catalyst retentate stream 255 has a solids content between about 75 wt % and about 85 wt %. In other embodiments, catalyst retentate stream 255 has a solids content between about 80 wt % and about 95 wt %.

The calcined catalyst solids are collected and removed from calcination unit 230 via line 270. A valve (not shown) may be used to regulate the flow of catalyst solids in line 270. In some embodiments, the treatment of the catalyst solids loaded in calcination unit 230 may be sufficient to produce a free-flowing catalyst powder. In other embodiment, the treatment of the catalyst solids in calcination unit 230 may be such that a wet catalyst powder is produced.

The calcined catalyst solids 270 exiting calcination unit 230 are warm, typically at a temperature ranging from 250° F. to 400° F. (about 120-205° C.), preferably from 250° F. to 350° F. (about 120-177° C.), more preferably from 275° F. to 325° F. (about 135-163° C.). In some embodiments, the calcined catalyst solids 270 are cooled to a temperature below about 250° F. (about 120° C.) before further processing. In alternate embodiments, the calcined catalyst solids 270 are cooled to a temperature below about 200° F. (about 93° C.) before further processing. In yet other embodiments, the calcined catalyst solids 270 are cooled to a temperature below about 175° F. (about 80° C.) before further processing.

The calcined catalyst solids 270 may be cooled in a conveyor 280. Conveyor 280 may comprise a screw-type conveyor, a pneumatic conveyor, a gravity-driven inclined conveyor and the like. The conveyor may comprise a means for cooling. The cooling in conveyor 280 may be provided by a heat-transfer medium 285 passing through conveyor 280 in a manner effective to collect some of the heat from the calcined solids 270. The heat-transfer medium then exits conveyor 280 as heated heat-transfer medium 288. In some embodiments, heat-transfer medium 285 may comprise water. In alternate embodiments, the cooling in conveyor 280 is provided by exposure to a cool atmosphere surrounding the calcined catalyst 270, where the cool atmosphere has a temperature of less than that of the calcined catalyst solids 270 as they enter conveyor 280. For example, the cool atmosphere may be at ambient temperature. Some of the heat from the calcined catalyst solids from line 270 can be transferred to the cool atmosphere as they pass through conveyor 280, thereby cooling the catalyst solids. The atmosphere surrounding the calcined catalyst solids from line 270 passing through conveyor 280 can contain $O_2$, since the oxidation step in calcination unit 230 generated non-reactive solids by converting metallic components into oxide forms. In some embodiments, the atmosphere in conveyor 280 surrounding calcined catalyst solids passing through conveyor 280 comprises air. In other embodiments, the atmosphere surrounding the calcined catalyst solids in conveyor 280 is air. In preferred embodiments, the atmosphere surrounding the calcined catalyst solids in conveyor 280 is air at ambient pressure and temperature.

The calcined catalyst solids are cooled as they pass through conveyor 280. Cooled solids 290 then exit conveyor 280. The cooled solids 290 can be emptied into bags, railcars, truck tanks, boxes, containers, and the like by employing for example hoppers and/or flow bins, for disposal and/or shipment to a reclamation site.

In an alternate embodiment of FIG. 3 (not illustrated), the system does not have a conveyor 280, and instead, the warm calcined catalyst solids 270 exiting calcination unit 230 are collected into one of two or more hoppers. One hopper, when full, is moved aside for cooling while a second hopper is loaded with warm calcined catalyst solids which exit calcinations unit 230.

In some embodiments, the off-gas 275 from the calcination unit 230 is optionally cooled by a heat-exchanger (not shown). Off-gas 275 can be combined with other off-gases from any of spent catalyst handling units, such as off-gas 295 from conveyor 280. The combination of off-gas 275 with other off-gas may be carried out after the optional cooling step.

In optional embodiments, the combined off-gases 275 and 295 pass through a dust collection system 300 so that a solid-free gas can exit via line 305 dust collection system 300. Solids 310 exiting the dust collector system 300 can be returned to the conveyor 280 for ultimate recovery in cooled solids exiting conveyor 280 via line 290.

Figure 4:
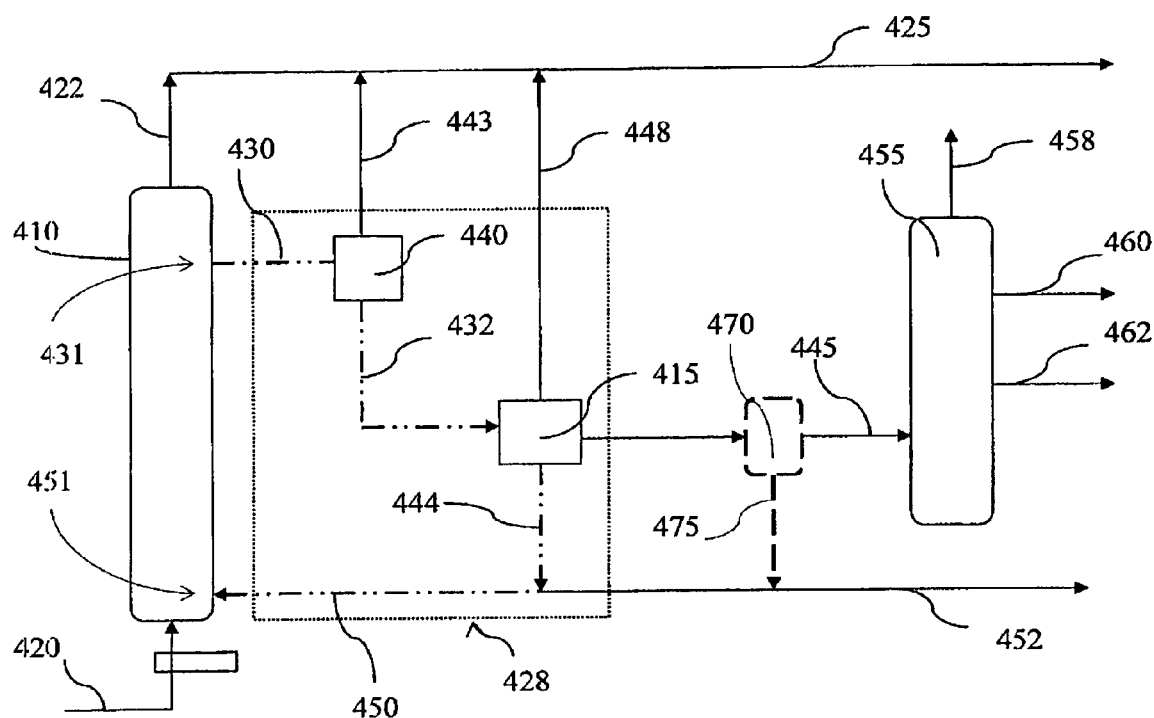
FIG. 4 illustrates embodiments of different means of providing a catalyst slurry stream to the catalyst recovery process according to the present invention, said means comprising a catalytic reaction system and a solid-liquid separation unit connected to said catalytic reaction system.

FIG. 4 relates to a Fischer-Tropsch process 400 comprising a Fischer-Tropsch reactor 410, a catalyst-hydrocarbon separation unit 415, and a fractionator 455. FIG. 4 illustrates a method for providing slurry stream 50 in FIGS. 1 and 2 or slurry streams 235, 250 of FIG. 3.

Fischer-Tropsch reactor 410 preferably is a slurry bed reactor; however, other types of reactors are also envisioned. Slurry bed reactors are known in the art and are also referred to as "slurry reactors" or "slurry bubble column reactors." Fischer-Tropsch reactor 410 as a slurry bed reactor operates by dispersing solid particles of a Fischer-Tropsch catalyst in a liquid inside a reactor vessel by means of gas agitation, wherein the mixture of solid catalyst particles and the liquid forms a slurry. The slurry in reactor 410, without gas hold-up, typically comprises between 5 percent by weight (wt %) and about 40 wt % of solid catalyst particles in a dispersing liquid. The slurry in reactor 410 with the gas hold-up is typically referred to as 'expanded slurry'. The dispersing liquid in the slurry typically comprises a hydrocarbonaceous liquid, preferably comprises a mixture of hydrocarbonaceous compounds, more preferably comprises hydrocarbon products synthesized in said Fischer-Tropsch reactor 410.

A syngas stream 420 comprising hydrogen ($H_2$) and carbon monoxide (CO) (the mixture thereof typically called synthesis gas or syngas) is fed near or at the bottom of Fischer-Tropsch reactor 410 through a gas distributor (not shown), thereby producing gas bubbles. As the gas bubbles rise through the reactor, the $H_2$ and CO reactants are absorbed into the liquid phase of the slurry and diffuse to the Fischer-Tropsch catalyst where they are converted to hydrocarbon liquids, hydrocarbon gases, and water. At least a portion of the hydrocarbon gases and the water enter the gas bubbles as they rise to the top of Fischer-Tropsch reactor 410 where they exit the reactor vessel via overhead gas stream 422.

In the Fischer-Tropsch reactor embodiment, the syngas stream 420 is fed to a Fischer-Tropsch reactor 410 containing the Fischer-Tropsch catalyst to be recovered by the present invention, i.e., a metal catalyst activated by the partial reduction of metal oxide present on a catalyst support. The feed gases charged to the process of the invention comprise hydrogen, or a hydrogen source, and carbon monoxide. $H_2/CO$ mixtures suitable as a feedstock for conversion to hydrocarbons according to the process of this invention can be obtained from light hydrocarbons such as methane by means of steam reforming, auto-thermal reforming, dry reforming, advanced gas heated reforming, partial oxidation, catalytic partial oxidation, or other processes known in the art. Alternatively, the $H_2/CO$ mixtures can be obtained from biomass and/or from coal by gasification. In addition, the feed gases can comprise off-gas recycle from the present or another Fischer-Tropsch process. Preferably the hydrogen is provided by free hydrogen, although some Fischer-Tropsch catalysts have sufficient water gas shift activity to convert some water to hydrogen for use in the Fischer-Tropsch process. It is preferred that the molar ratio of hydrogen to carbon monoxide in the syngas stream 420 be greater than about 0.5:1 (e.g., from about 0.67 to about 2.5). Preferably, when cobalt, nickel, iron and/or ruthenium catalysts are used, the syngas stream 420 contains hydrogen and carbon monoxide in a molar ratio of about 1.4:1 to about 2.3:1. The feed gas may also contain carbon dioxide. The syngas stream 420 should contain a low concentration of compounds or elements that have a deleterious effect on the catalyst, such as poisons. For example, the syngas stream 420 may need to be pretreated to ensure that it contains low concentrations of sulfur or nitrogen compounds such as hydrogen sulfide, ammonia and carbonyl sulfides.

During operation of Fischer-Tropsch process 400, the reaction zone contained in Fischer-Tropsch reactor 410 is maintained at conversion-promoting conditions effective to produce the desired hydrocarbon liquids. The Fischer-Tropsch process is typically run in a continuous mode. In this mode, the gas hourly space velocity through the reaction zone typically may range from about 50 $hr^{-1}$ to about 10,000 $hr^{-1}$, preferably from about 300 $hr^{-1}$ to about 2,000 $hr^{-1}$. The gas hourly space velocity is defined as the volume of reactant gases (i.e., syngas stream) per time per reaction zone volume. The volume of reactant gases is at standard conditions of pressure (101 kPa) and temperature (0° C.). The reaction zone volume is defined by the portion of the reaction vessel volume where reaction takes place and which is occupied by a gaseous phase comprising reactant gases, products and/or gaseous inerts; a liquid phase comprising liquid/wax products and/or other liquids; and a solid phase comprising catalyst. The reaction zone temperature in reactor 410 is typically in the range from about 160° C. to about 300° C. Preferably, the reaction zone is operated at conversion promoting conditions at temperatures from about 190° C. to about 260° C., more preferably from about 205° C. to about 230° C. The reaction zone pressure in reactor 410 is typically in the range of from about 80 psia (552 kPa) to about 1000 psia (6895 kPa), more preferably from about 80 psia (552 kPa) to about 800 psia (5515 kPa), and still more preferably, from about 140 psia (965 kPa) to about 750 psia (5170 kPa). Most preferably, the reaction zone pressure is from about 250 psia (1720 kPa) to about 650 psia (4480 kPa).

Any suitable reactor configuration that allows contact between the syngas feed and the catalyst may be employed for Fischer-Tropsch reactor 410. The syngas stream 420 (in gaseous form) is contacted with the catalyst in a reaction zone. Mechanical arrangements of conventional design may be employed as the reaction zone including, for example, fixed bed, fluidized bed, slurry bubble column or ebulliating bed reactors, among others. Accordingly, the preferred size and physical form of the catalyst particles may vary depending on the reactor in which they are to be used. Most preferably, Fischer-Tropsch reactor 410 comprises a slurry bubble column reactor loaded with solid catalyst particles comprising cobalt and/or ruthenium with optionally promoters. The solid catalyst particles may have a size varying from sub-micron up to about 250 microns. In some embodiments, 90 percent by weight of the solid catalyst particles should have a size between about 10 and 150 microns. In other embodiments, the solid catalyst particles should have a weight average size between about 30 microns and 150 microns, preferably between about 40 microns and 100 microns, more preferably between about 60 microns and 90 microns.

Fischer-Tropsch solid catalysts to be used in reactor 410 are well known in the art and generally comprise a catalytically active metal, a promoter and optionally a support structure. The most common catalytic metals are Group 8, 9 and 10 metals of the Periodic Table (new IUPAC Notation), such as cobalt, nickel, ruthenium, and iron or mixtures thereof. The preferred metals used in Fischer-Tropsch catalysts with respect to the present invention are cobalt, iron and/or ruthenium, however, this invention is not limited to these metals or the Fischer-Tropsch reaction. Other suitable catalytic metals include Groups 8, 9 and 10 metals. The promoters and support material are not critical to the present invention and may be comprised, if at all, by any catalyst composition known and used in the art. Promoters suitable for Fischer-Tropsch synthesis may comprise at least one metal from Group 1, 7, 8, 9, 10, 11, and 13. When the catalytic metal is cobalt, the promoter is preferably selected from the group consisting of ruthenium (Ru), platinum (Pt), palladium (Pd), rhenium (Re), boron (B), silver (Ag), and combinations thereof. When the catalytic metal is iron, the promoter is preferably selected from the group consisting of lithium (Li), copper (Cu), potassium (K), silver (Ag), manganese (Mn), sodium (Na), and combinations thereof. The support composition, when used, preferably comprises an inorganic oxide selected from the group consisting of alumina, silica, titania, zirconia, boria, and mixtures thereof. The inorganic oxide is preferably stabilized by the use of a structural promoter or stabilizer, in order to confer hydrothermal resistance and/or attrition resistance to the support and the catalyst made therefrom. Preferred supports comprise stabilized or modified alumina, stabilized or modified titania, silica-alumina, or zirconia-titania.

In preferred embodiments, Fischer-Tropsch process 400 comprises one or more hydrocarbon synthesis reactors, and each reactor comprises a slurry bubble column operated with particles of a cobalt-containing catalyst.

In Fischer-Tropsch reactor 410, $H_2$ and CO combine in a polymerization-like fashion to form hydrocarbon compounds having varying numbers of carbon atoms. Hence, the Fischer-Tropsch synthesis can produce a broad range of hydrocarbon products with carbon numbers ranging from 1 up to about 200, the majority of which are commonly referred to as 'hydrocarbon wax', comprised primarily of paraffins, some olefins, and some oxygenates (oxygen-containing hydrocarbonaceous compounds). At least a small portion of Fischer-Tropsch waxy hydrocarbons having greater than about 10 carbon atoms cannot be completely separated from the slurry using normal solid/liquid separation techniques, and these waxy hydrocarbons are typically part of the slurry liquid within reactor 410. Overhead gas stream 422 from reactor 410 may be combined with other off-gases or tail gases from other units (such as offgas 443 from units 440 and offgas 448 from separation unit 415) to form overall tail gas 425. Overhead gas stream 422 and/or overall tail gas 425 may be sent to a gas plant (not shown) for further processing for at least in part recycling some unconverted reactants to various processes, including reactor 410 and other Fischer-Tropsch reactors.

At least a portion of the three-phase gas-expanded slurry comprising the Fischer-Tropsch catalyst and hydrocarbons and entrapped gas exits the Fischer-Tropsch reactor 410 as reactor slurry stream 430 at a reactor outlet 431 typically, although not necessarily, in the top half of the reactor vessel and enters an external slurry circulation loop 428. The external slurry circulation loop 428 is illustrated by dashed lines 430, 432, 444, and 450. Loop 428 starts at reactor outlet 431 via stream 430, passes through a degasser 440 and a catalyst-hydrocarbon separation unit 415, and returns at reactor inlet 451 via stream 450. Since reactor slurry stream 430 typically comprises entrapped gas, reactor slurry stream 430 is passed through degasser 440 to separate entrapped gas from the slurry and form a degassed slurry stream 432 and degasser gas effluent 443. The degassed slurry stream 432 is typically a two-phase slurry containing catalyst particles and liquid waxy hydrocarbons.

Degassed slurry stream 432 is further passed through catalyst-hydrocarbon separation unit 415 to be separated into hydrocarbon product stream 445 and solid-enriched slurry stream 444.

Catalyst-hydrocarbon separation unit 415 can be any solid-liquid separation system, which can provide a liquid product stream (e.g., 445) which is catalyst-lean or substantially free of catalyst solid and a catalyst-rich slurry stream (e.g., 444). Catalyst-hydrocarbon separation unit 415 can employ one or more solid-liquid separation techniques such as filtration, decantation, sedimentation, centrifugation, magnetic separation, or any combination thereof. Catalyst-hydrocarbon separation unit 415 could comprise a settler, a filter, a hydrocyclone, a centrifuge, a magnetic separation unit, any plurality thereof, or any combination thereof. In preferred embodiments, catalyst-hydrocarbon separation unit 415 comprises a settler, a filter, any plurality thereof, or any combination thereof. In some embodiments, catalyst-hydrocarbon separation unit 415 comprises a settler and a filter operated in series.

In some embodiments, the separation units 20 and 220 in the catalyst recovery systems 10 of FIG. 1 and 210 of FIG. 3 respectively comprise the same type of separation units as separation unit 415 used in the external slurry circulation loop 428 of FIG. 4.

In some embodiments of FIG. 4, the catalyst-hydrocarbon separation unit 415 may further generate an optional gas effluent 448. Gas effluent 443 from degasser 440, overhead gas stream 422 from reactor 410, and optional gas effluent 448 from unit 415, may be combined to form overall tail gas 425.

Under typical reactor operating conditions, the catalyst-enriched slurry stream 444 would be recycled almost entirely to Fischer-Tropsch reactor 410 via line 450. However, when it is desirable to remove all of or a portion of the catalyst-enriched slurry stream 444 for catalyst reclamation, the slurry stream 444 can be diverted, either in totality (not shown) or partially, to a catalyst recovery system (such as system 10 of FIG. 1 or system 210 of FIG. 3). A portion 450 (e.g., a slipstream) of solid-enriched slurry stream 444 can be recycled to reactor 410 at reactor inlet 451, while another portion 452 of solid-enriched slurry stream 444 can provide slurry feedstream 50 to the catalyst recovery system 10 of FIG. 1 or can provide either of the slurry streams 235 and 250 to the catalyst recovery system 210 of FIG. 3. Further, when the slurry volume in Fischer-Tropsch reactor 410 declines to the point where the slurry level in reactor 410 is below the exit point of slurry stream 430 (i.e., reactor outlet 431), the slurry inside reactor 410 may be allowed to exit Fischer-Tropsch reactor 410 from line 450 in reverse direction (not shown) to provide, in part or in totality, the slurry feedstream 50 feeding the separation unit 20 of FIG. 1, or alternatively) to provide, in part or in totality, the slurry stream 235 or 250 to feed the separation unit 220 of FIG. 3.

Referring again to FIG. 4, Fischer-Tropsch product stream 445 exiting separation unit 415 can be fed to a fractionator 455 in order to separate its hydrocarbon components based on their boiling range. Hydrocarbon product stream 445 may comprise small amounts of solids, and these solids in stream 445 may be further removed by a polishing filter (not shown) prior to being sent to fractionator 455. Several fractions of different boiling ranges exit fractionator 455. Some of the fractions comprise at least in part a light gas effluent 458, a naphtha stream 460 and a middle distillate stream 462. Middle distillate stream 462 may comprise diesel or kerosene. Although not shown, heavier hydrocarbon fractions containing hydrocarbons with a boiling point outside that of middle distillate range may be additionally obtained. Either of the naphtha stream 460 and middle distillate stream 462 or any combination of both may form the washing medium 160 employed in separation unit 120 of FIG. 2, which can be used in the separation systems 20 of FIG. 1 and 220 of FIG. 3. Preferably, separation systems 20 of FIG. 1 and 220 of FIG. 3 employ the separation system 120 of FIG. 2 and the washing medium 160 comprises at least a portion of middle distillate stream 462.

In one optional embodiment of FIG. 4, Fischer-Tropsch product stream 445 containing catalyst fines and can be fed to a secondary separation unit 470 (shown in dotted line) to remove some catalyst fines before it is fed to fractionator 455. It is envisioned that the product stream exiting secondary separation unit 470 is substantially free of catalyst fines (i.e., less than 10 ppm of fines, preferably less than 5 ppm fines; more preferably less than 2 ppm fines) and is subsequently sent to fractionator 455. Catalyst fines 475 recovered from secondary separation unit 470 could be sent to the catalyst recovery system (such as systems 10 and 210 of FIGS. 1 and 3, respectively). Catalyst fines 475 could be combined with slurry stream 452 (as illustrated in dotted line), before slurry stream 452 is fed to the catalyst recovery system; alternatively, catalyst fines 475 could be added to a surge or holding vessel which already contains some spent catalyst slurry, wherein a withdrawn slurry from the surge or holding vessel can serve as a source of spent catalyst slurry for the catalyst recovery system.

In an embodiment (not illustrated), a valve regulating the flow of slurry stream 452 can be also used to regulate the flow of slurry exiting the external slurry circulation loop 428.

Additionally, when the catalyst recovery system (such as systems 10 or 210 of FIGS. 1 and 3, respectively) is not being utilized, block valves in the line connecting slurry stream 452 from reactor system 400 to slurry feedstream 50 (or slurry streams 235 or 250) of catalyst recovery system 10 (or 210) may be closed so as to isolate the recovery system, for example to purge the facility with a cleaning fluid.

In embodiments not illustrated in FIG. 4, at least a portion of the syngas stream 420 is preferably provided by one syngas reactor which comprises a partial oxidation (POX) reactor. More preferably, at least a portion of the syngas stream 420 is provided by one syngas reactor which comprises a catalytic partial oxidation (CPOX) reactor comprising a catalyst. Any suitable POX reactor, catalytic or non-catalytic, such as are known in the art may be used upstream of the present invention. Likewise, the syngas used in the Fischer-Tropsch reaction of the present system may be provided from any suitable source. Additional description for operating a CPOX reactor is disclosed in co-owned U.S. Pat. Nos. 6,402,989; 6,409,940; 6,461,539; 6,630,078; 6,635,191; and US published patent application 2002-0115730, each of which is incorporated herein by reference in its entirety.

In alternative embodiments, POX reactor may be replaced with or supplemented with other syngas production units capable of converting a hydrocarbon gas feedstream (such as methane, ethane or other gaseous alkanes, or natural gas) to syngas. These are known in the art and include steam reformers, dry (i.e., $CO_2$) reformers and/or auto-thermal reformers that combine steam reforming and partial oxidation.

The approach used in the present invention to recover a catalyst in a form suitable for reclamation provides several advantages. As mentioned previously, an important economic advantage is that removal of substantially all organic residue (e.g., hydrocarbon wax) from the catalyst reduces the total weight and bulk of the recovered catalyst to be shipped, thereby reducing the cost associated with transporting the recovered catalyst. Additionally, recovering synthesized hydrocarbons in the catalyst slurry and processing them for sale is another economic advantage. Catalyst solids that are substantially free of organic residue (e.g., hydrocarbon wax residue) are easier to handle from a health and safety perspective and easier to dispose off in an environmentally sound manner.

The present invention does not require an expensive heating process which may also result in the formation of undesirable products. Furthermore, the method of the present invention uses streams within the facility that are readily available (such as steam) and even sometimes considered a waste or undesirable streams under normal operation, i.e., hot gas, naphtha, and/or nitrogen. Another benefit is that any of the liquid-solid separation unit (such as filter or filters) of the present invention could be used for emergency back-up in the case of an operation upset in the Fischer-Tropsch process. For example, if synthesis gas generation is lost, the slurry comprising the Fischer-Tropsch catalyst and the hydrocarbon liquids (including hydrocarbon wax) could be passed through the liquid-solid separation unit in order to separate the hydrocarbon liquids from the catalyst. This will prevent the mixture of catalyst and hydrocarbon wax from cooling and possibly solidifying inside the reactor which could result in an expensive shutdown for manual cleanout of the reactor.

While the preferred embodiments of the invention have been shown and described, modifications thereof can be made by one skilled in the art without departing from the scope of the invention. Reactor design criteria, pendant hydrocarbon processing equipment, and the like for any given implementation of the invention will be readily ascertainable to one of skill in the art based upon the disclosure herein. The embodiments described herein are exemplary only, and are not intended to be limiting. Use of the term "optionally" with respect to any element of a claim is intended to mean that the subject element is required, or alternatively, is not required. Both alternatives are intended to be within the scope of the claim. Likewise, unless explicitly stated otherwise, the sequential recitation of steps in the claims below is not intended to require that the steps be performed sequentially, or that one step must be completed before commencement of another step.

Accordingly, the scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A process for recovering a solid metal-containing catalyst from a slurry, said process comprising:
   a) providing a catalyst slurry feedstream comprising a solid catalyst and wax hydrocarbons, said solid catalyst including a metallic component;
   b) optionally, adding a second feedstream to the catalyst slurry feedstream;
   c) passing the catalyst slurry feedstream through a solid-liquid separation unit to separate said slurry feedstream into a liquid stream and a retentate stream, both of which exit the solid-liquid separation unit, wherein the retentate stream is enriched in solid catalyst, and has a content in wax hydrocarbons that is less than the catalyst slurry feedstream;
   d) contacting the solid catalyst with a washing medium in a manner effective to displace some of the wax hydrocarbons and wash the solid catalyst; and
   e) treating the washed solid catalyst under conditions sufficient to convert the metallic component into a non-reactive form to generate non-reactive solids, wherein said conditions in step e) comprise exposing said washed solid catalyst to an oxidizing gas or oxidizing atmosphere comprising steam.

2. The process according to claim 1 wherein the solid-liquid separation unit comprises a rotary filtration unit.

3. The process according to claim 1 wherein either or both of the second feedstream and the washing medium composes an organic solvent.

4. The process according to claim 1 wherein step e) is carried out at a temperature that is greater than the highest of the boiling point and end boiling point temperature of the second feedstream and the washing medium.

5. The process according to claim 1 wherein the washing medium comprises steam.

6. The process according to claim 1 wherein at least one of steps b) through e) includes adding heat.

7. The process according to claim 1 wherein either or both of the second feedstream and the washing medium comprises a viscosity-reducing organic solvent.

8. The process according to claim 1 wherein either or both of the second feedstream and the washing medium comprises an organic solvent that dissolves at least some of the wax hydrocarbons from the solid catalyst structure.

9. The process according to claim 1 wherein the conditions in step e) comprise passing an oxidizing gas to contact the washed solid catalyst, wherein the oxidizing gas comprises steam and $O_2$.

10. The process according to claim 1 wherein step e) is carried out at 450-600° C.

11. The process according to claim 1, further comprising the following step:
    f) removing at least a portion of the remaining hydrocarbons from the washed solid catalyst using a stripping gas.

12. The process according to claim 1 wherein step a) comprises withdrawing a catalyst-containing slurry stream from a slurry bed reactor.

13. The process according to claim 1 wherein the solid catalyst comprises a metallic component selected from the group consisting of cobalt, ruthenium, and combinations thereof.

14. The process according to claim 1 wherein the metallic component of the catalyst comprises cobalt, and further comprises another element selected from the group consisting of silver, platinum, rhenium, boron, ruthenium, and combinations thereof.

15. The process according to claim 1 wherein step d) is carried out at the same time or in the same unit as step c).

16. An integrated process for producing hydrocarbons and recovering spent solid catalyst, comprising:
    a) contacting a hydrocarbon synthesis solid catalyst with a feedstream comprising carbon monoxide and hydrogen in a reaction zone under conversion promoting conditions to produce one or more hydrocarbons, wherein the hydrocarbon synthesis solid catalyst comprises a metal, and further wherein a deactivation of said solid catalyst takes place over time within said reaction zone to form spent solid catalyst;
    b) withdrawing at least a portion of the hydrocarbon synthesis solid catalyst from the reaction zone to provide a slurry feedstream comprising liquid hydrocarbons and solids, wherein the slurry solids comprising at least a portion of the spent solid catalyst;
    c) optionally, performing at least one step selected from the group consisting of: adjusting the hydrocarbon content of said slurry feedstream; adjusting the hydrocarbon composition of said slurry feedstream; adjusting the solids content of said slurry feedstream, and combinations thereof;
    d) separating the slurry feedstream into a liquid stream and a solids-enriched stream, wherein the liquid stream comprises most of the liquid hydrocarbons, and further wherein the solids-enriched stream comprises spent solid catalyst and remaining hydrocarbons;
    e) treating the solids-enriched stream under oxidative conditions sufficient to oxidize the catalyst metal to a non-zero oxidation state and optionally to remove the remaining hydrocarbons in order to generate oxidized metal-containing solids, wherein said treating step comprises exposing said solids-enriched stream to an oxidizing gas or oxidizing atmosphere comprising steam; and
    f) collecting the oxidized metal-containing solids for reclamation.

17. The process according to claim 16, wherein the collecting step comprises transporting the solids on a cooling conveyor.

18. The process according to claim 16 wherein step a) is carried out in a slurry bed reactor.

19. The process according to claim 16 wherein the solid catalyst comprises a metal selected from the group consisting of cobalt, ruthenium, and combinations thereof.

20. The process according to claim 16 wherein the conditions in said oxidative treatment step e) are such that said oxidized metal-containing solids are generated as a wet catalyst powder comprising a water content of up to 50 wt %.

21. The process according to claim 16 wherein said oxidizing gas or atmosphere in said oxidative treatment step (e) further comprises $O_2$.

22. The process according to claim 16 wherein said oxidizing gas in said oxidative treatment step (e) further comprises a sulfur-containing compound.

23. The process according to claim 1 wherein said oxidizing gas in said oxidative treatment step (e) further comprises a sulfur-containing compound, and wherein said step e) provides a sulfided metal as a non-reactive form of said metallic component.

24. The process according to claim 1 wherein the conditions in said treatment step e) are such that said non-reactive solids are generated as a wet catalyst powder comprising a water content of up to 50 wt %.

25. A process for recovering a spent solid metal-containing catalyst from a slurry for reclamation, said process comprising:
    a) providing a catalyst slurry feedstream comprising a solid catalyst and wax hydrocarbons, said solid catalyst including a metallic component;
    b) optionally, adding a second feedstream to the catalyst slurry feedstream;
    c) passing the catalyst slurry feedstream through a solid-liquid separation unit to separate said slurry feedstream into a liquid stream and a retentate stream, both of which exit the solid-liquid separation unit, wherein the retentate stream is enriched in solid catalyst, and has a content in wax hydrocarbons that is less than the catalyst slurry feedstream;
    d) contacting the solid catalyst with a washing medium in a manner effective to displace some of the wax hydrocarbons and wash the solid catalyst, wherein step (d) is carried out in the separation unit of step (c);
    e) treating the washed solid catalyst under conditions sufficient to convert the metallic component into a non-reactive form to generate non-reactive solids;
    f) removing at least a portion of remaining hydrocarbons from the washed solid catalyst, said step (f) comprising stripping with a stripping gas, vaporizing by addition of heat, or combination thereof, wherein step (f) is carried out in the same unit as step (e); and
    g) collecting said non-reactive solids for reclamation.

* * * * *